Feb. 21, 1933.                T. R. HARRISON                1,898,124
                       MEASURING AND CONTROL APPARATUS
                          Filed Nov. 27, 1928        10 Sheets-Sheet 4
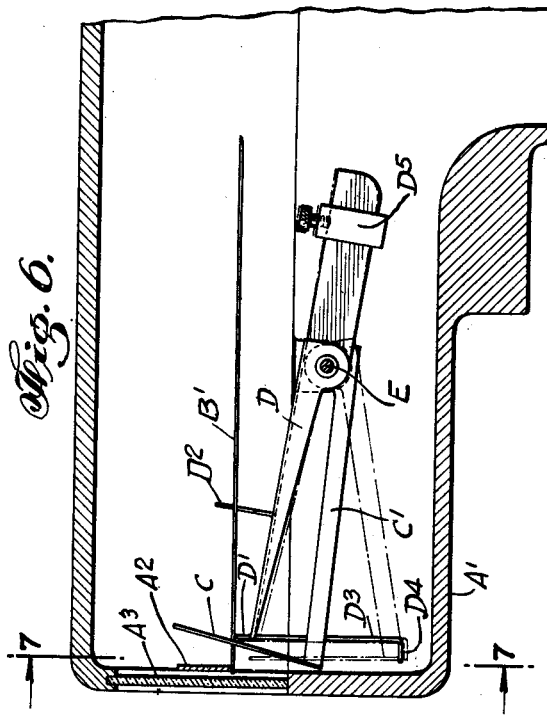
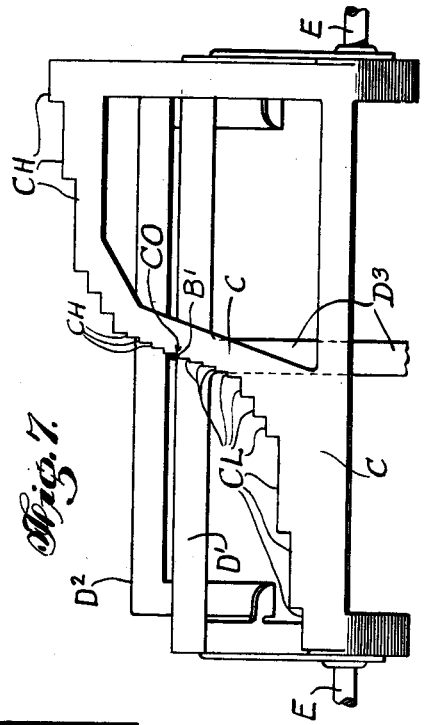
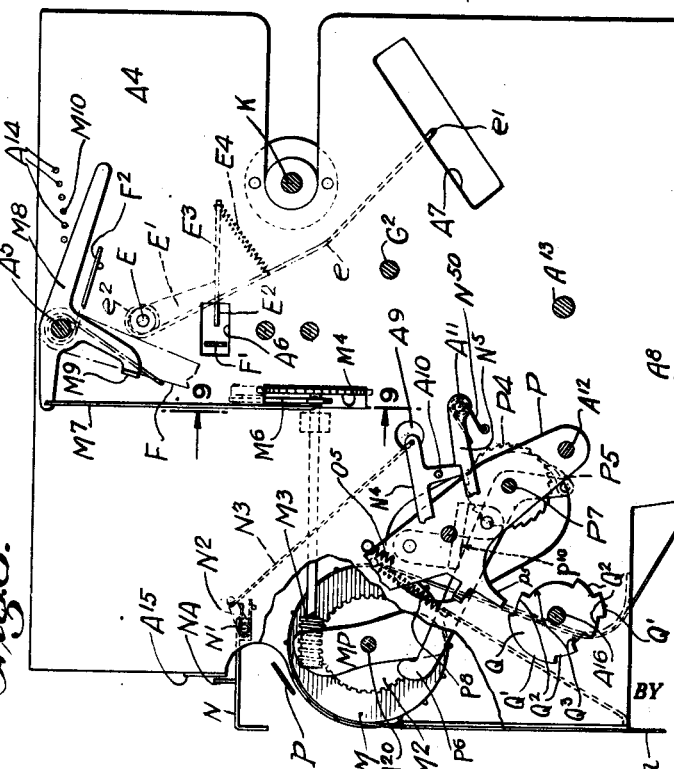
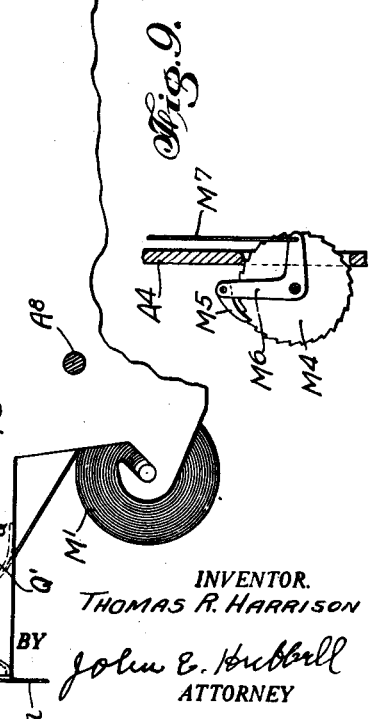
INVENTOR.
THOMAS R. HARRISON
BY
John E. Hubbell
ATTORNEY

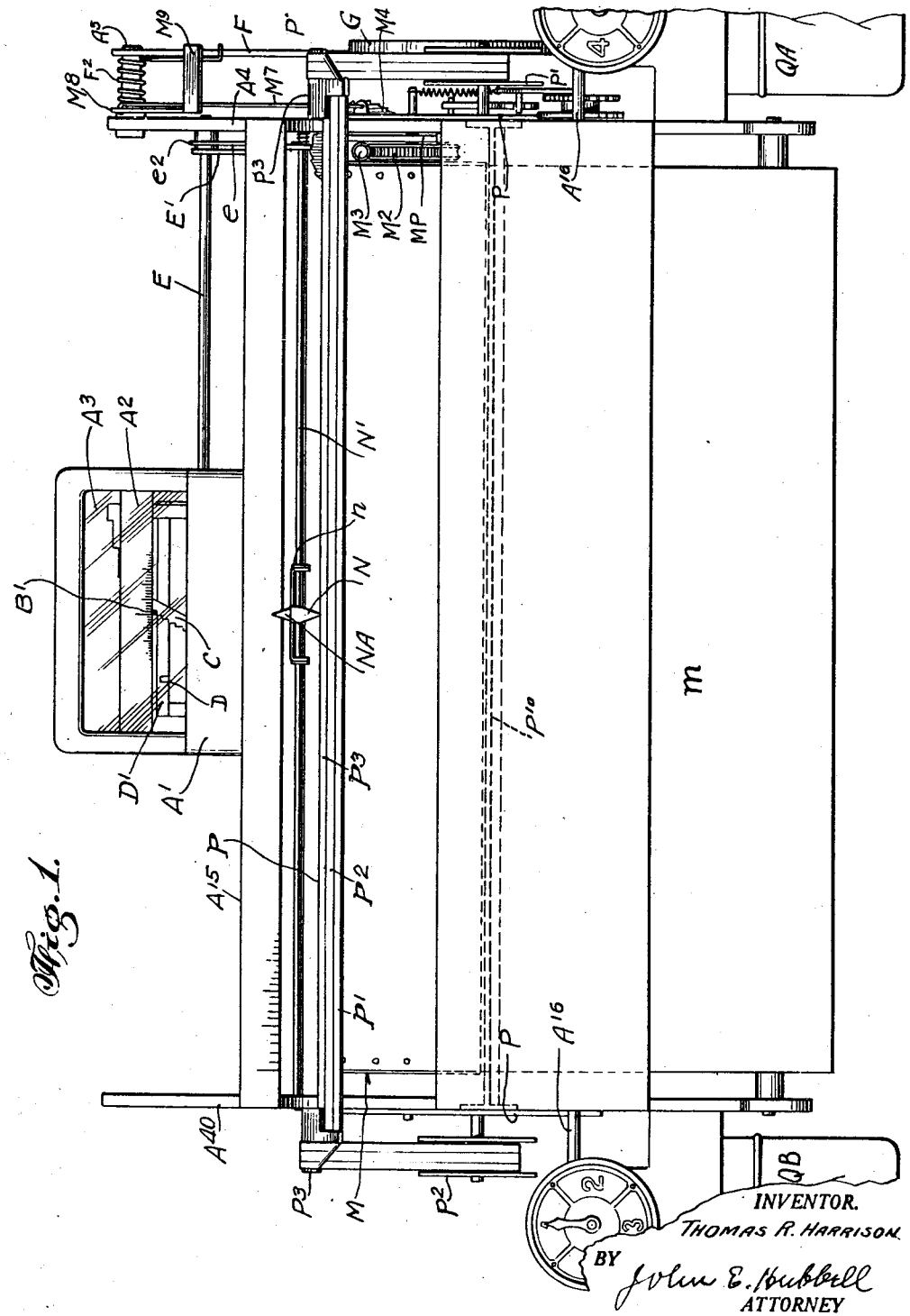

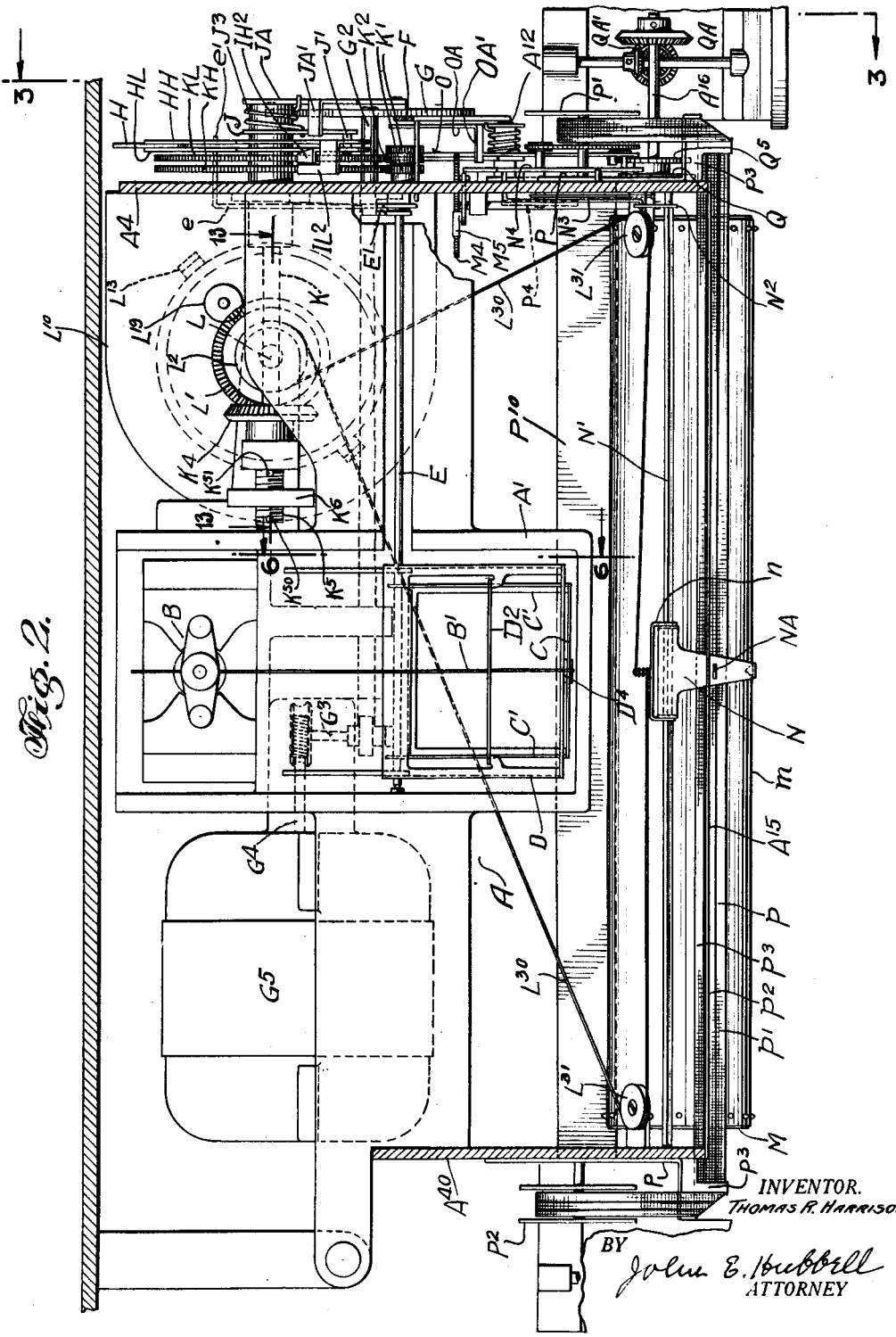

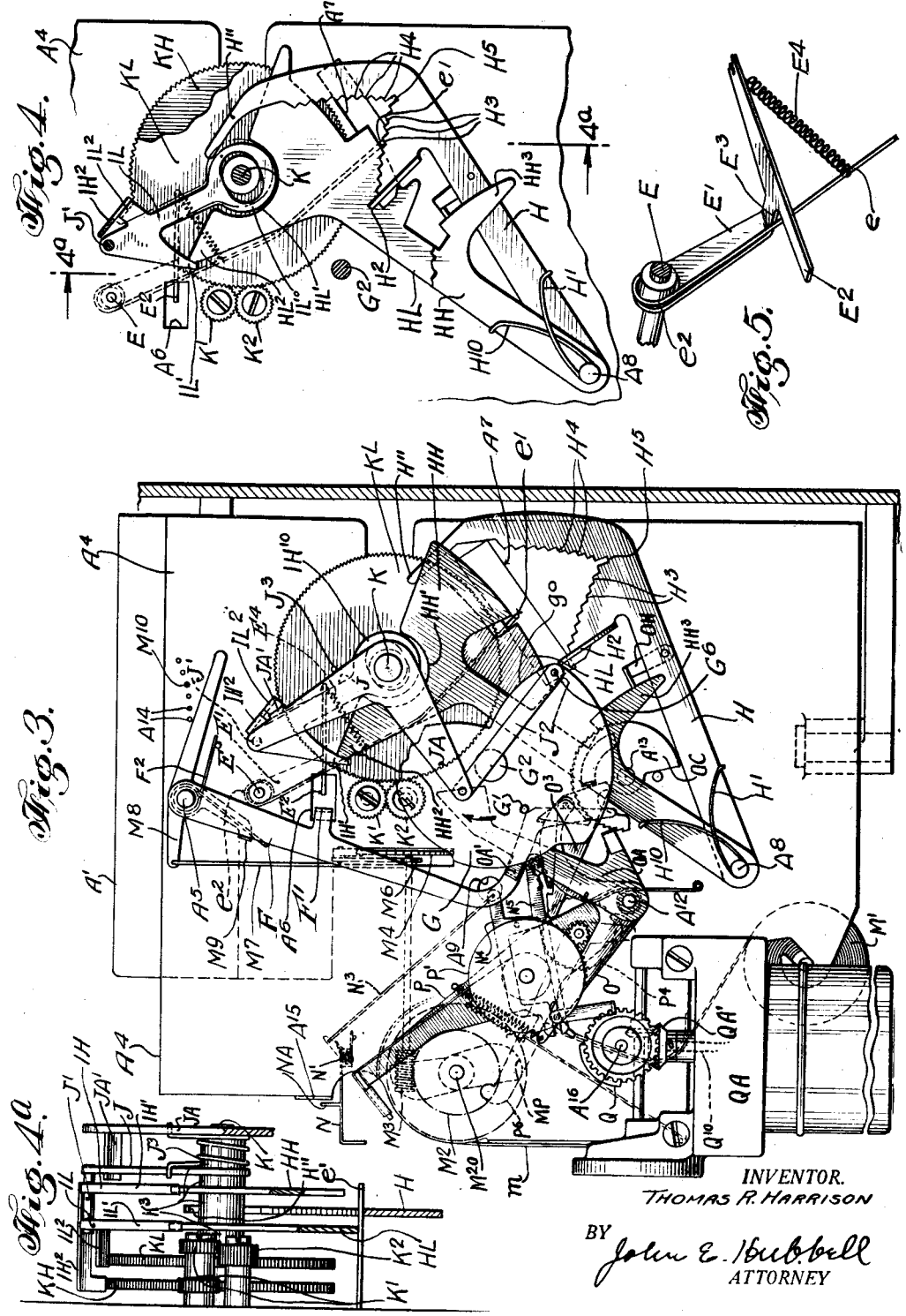

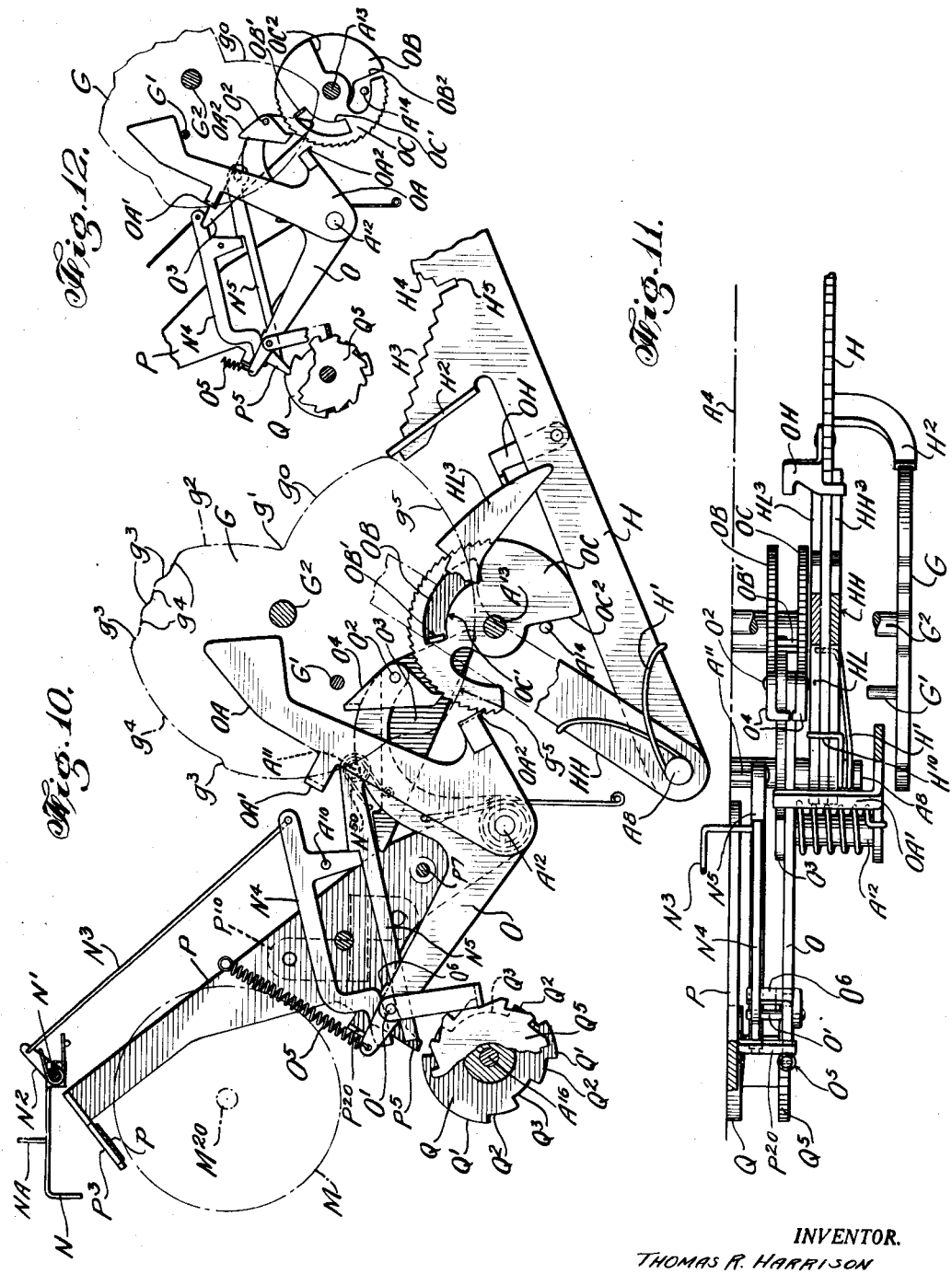

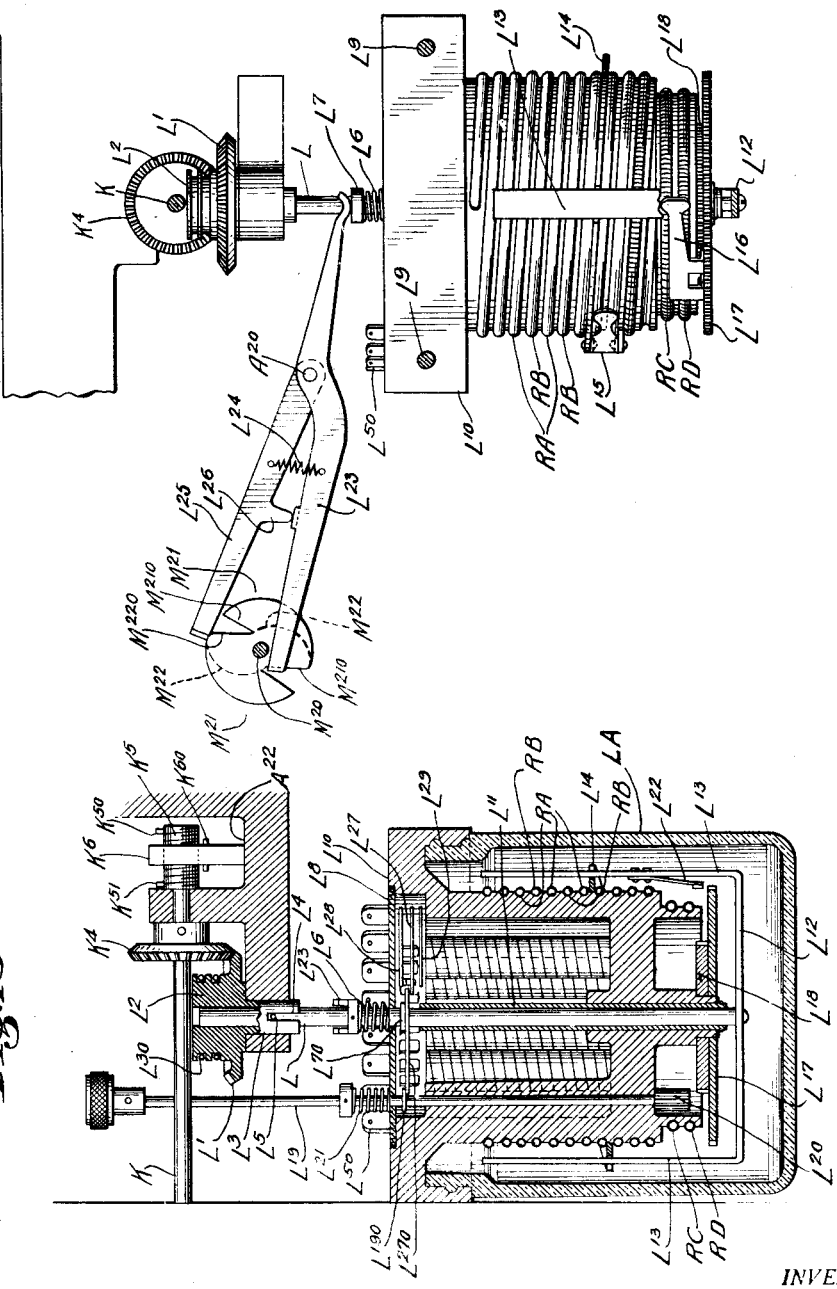

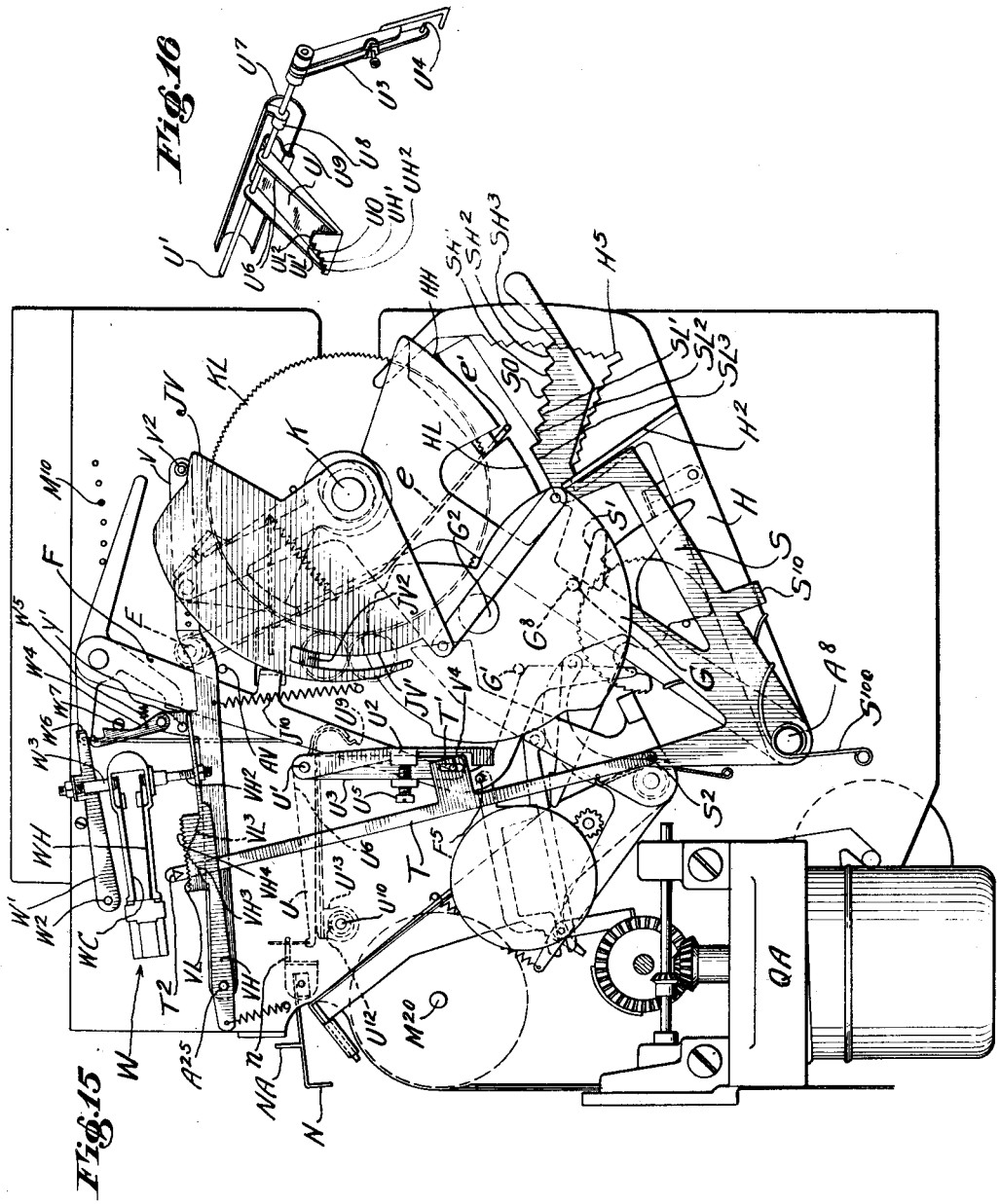

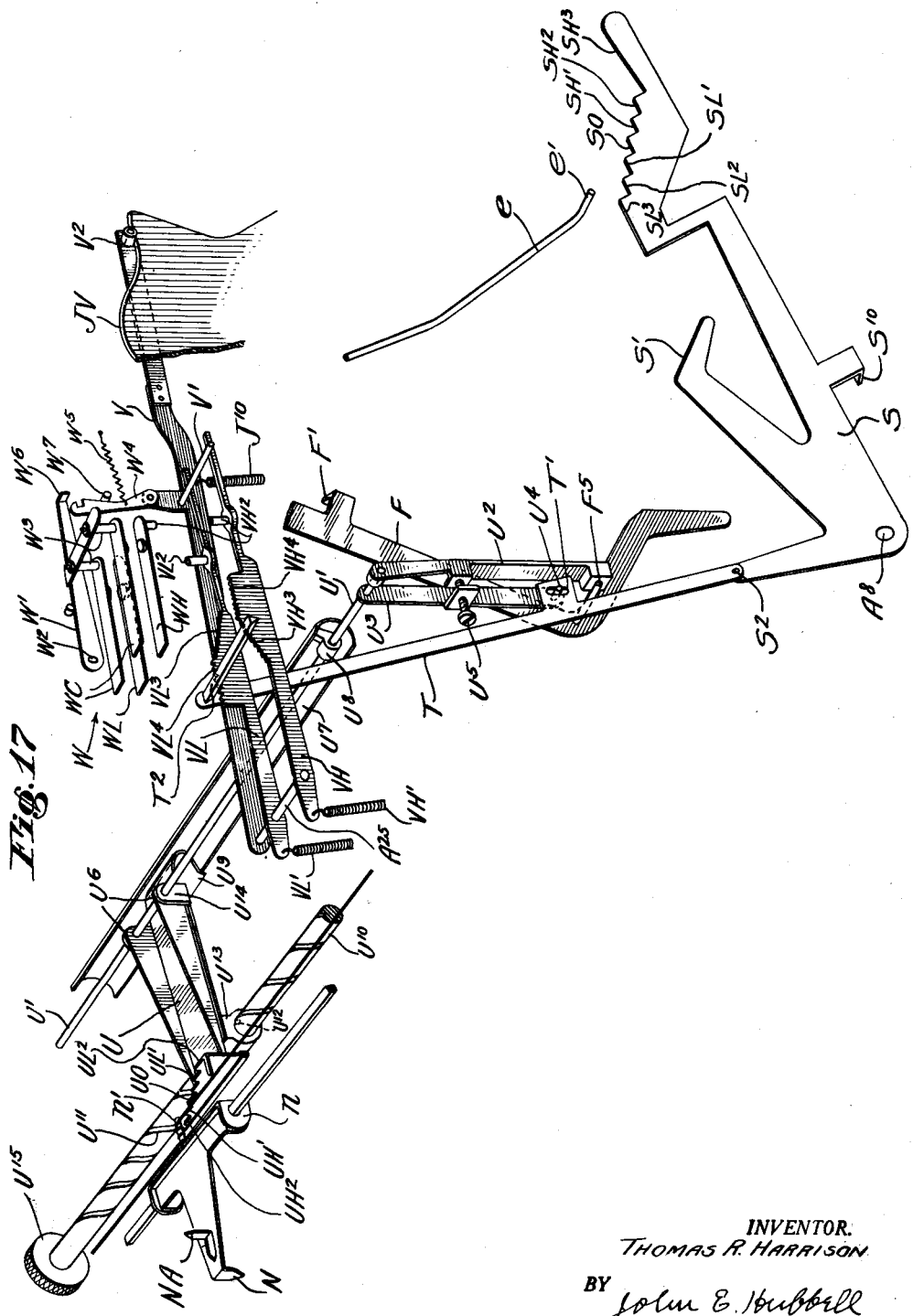

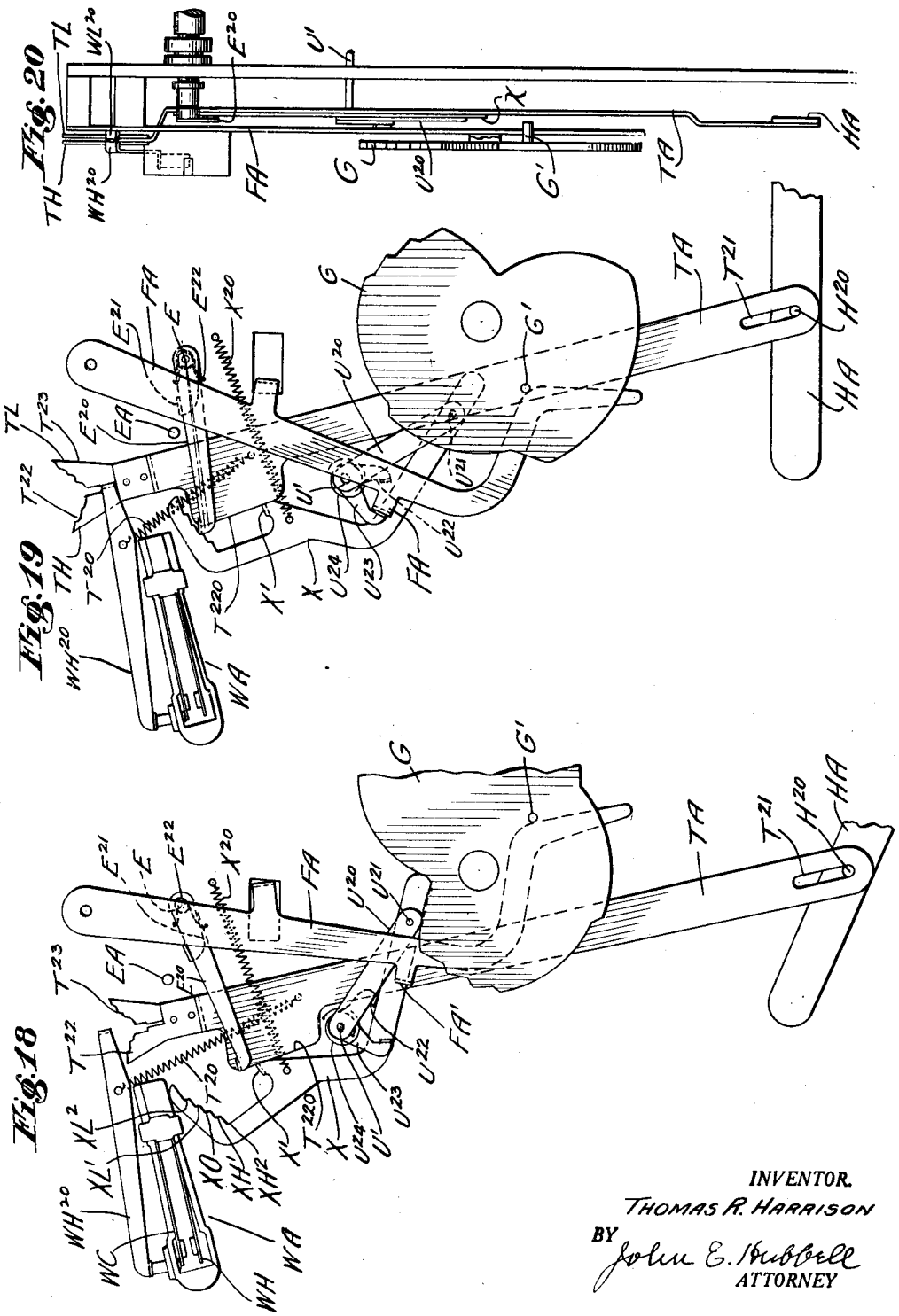

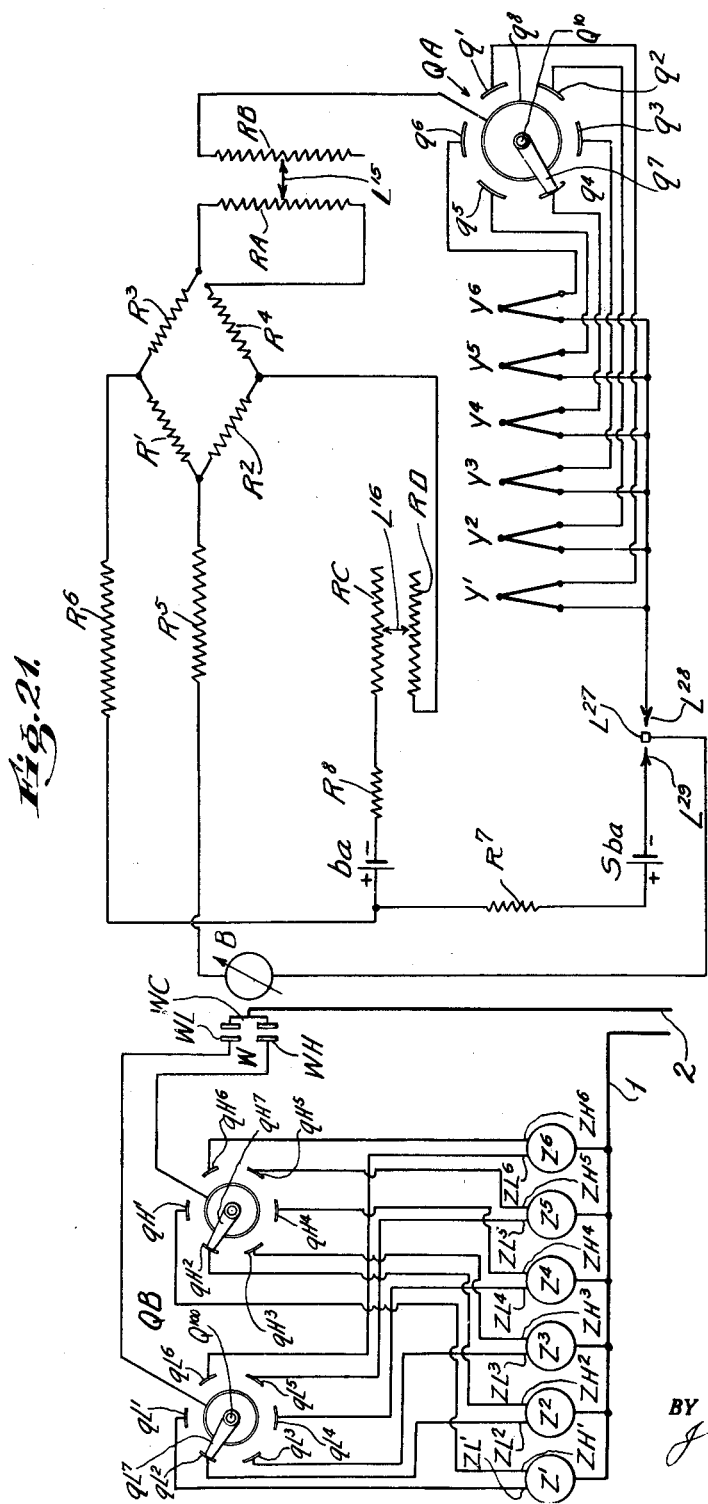

Patented Feb. 21, 1933

1,898,124

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

MEASURING AND CONTROL APPARATUS

Application filed November 27, 1928. Serial No. 322,269.

The present invention comprises improvements in measuring and control apparatus devised for the general purpose of improving the construction and operative characteristics and capacity of such apparatus.

One general object of my present invention is to provide a potentiometer measuring instrument characterized by the relative simplicity, reliability, durability and effectiveness of the means provided for automatically rebalancing the potentiometer circuit at suitable intervals, and for effecting corresponding adjustments of the exhibiting means ordinarily comprising means for visually indicating and for recording the values of the quantity or quantities measured.

Another general object of the invention disclosed herein is the provision of improved control mechanism for exerting controlling effects in response to variations in the values of the quantity or quantities measured, which ordinarily are designed to maintain said quantities at constant or predetermined values. For the practical attainment of the last mentioned general object of the invention, I have provided simple and effective combinations of control provisions with the potentiometer measuring apparatus hereinbefore mentioned. Those combinations are characterized by novel and effective features of construction and arrangement, and by their capacity for use in producing controlling effects varying widely in magnitude as required to minimize the extent of departure of the quantities measured from their predetermined values, and in case of such departures, to quickly return the quantities to their predetermined values with minimum liability to objectionable hunting fluctuation in the values of such quantities.

My improved control methods and apparatus disclosed herein are particularly characterized by the simple and effective manner in which they provide controlling effects which are jointly dependent upon the magnitude of departure of the controlled quantity from its predetermined value, and upon the rate at which the quantity varies towards or from its predetermined value. The invention disclosed herein is further characterized by the comparative simplicity of the part replacements and other adjustments required to adapt a measuring control instrument of standard design to different operating conditions, in which different gradations of potentiometer balancing or control effects are required or desirable to properly compensate for variations in value of the quantity or quantities measured and controlled. The hereinbefore mentioned control combinations and methods disclosed herein, are not herein claimed, but are claimed in my copending application, Serial No. 581,932, filed December 18, 1931.

Another improvement of substantial practical importance which is disclosed but not claimed herein, is the provision of recording mechanism, which simultaneously minimizes the number of record impressions made during periods in which, for one reason or another, the potentiometer re-balancing operations do not result in the quick attainment of exact balance, and wherein in consequence a record impression or impressions produced in the early portion of the time required for a series of re-balancing operations would form an inaccurate record of the value of the quantity measured, without any similar reduction in the number of record impressions made during periods in which exact potentiometer balance is obtained with more desirable rapidity. The last mentioned improvement while not claimed herein, is claimed in my copending application, Serial No. 146,141, filed November 4, 1926.

A further specific object of the invention of large practical importance, is the simplification and reduction of the inherent cost of construction and weight and inertia of the parts provided to insure desirable ruggedness, strength and reliability in operation of the mechanical relay mechanism employed to adjust the instrument circuit resistance and exhibiting means, in re-balancing the potentiometer circuit, without impressing objectionable strains upon the delicate and sensitive galvanometer associated with the potentiometer circuit and controlling the operations of said relay mechanism.

The various features of novelty which characterize the present invention are pointed out with particularity in the claims annexed to and forming a part of this specification. For a better understanding of the invention, however, its advantages and the objects obtained with it, including some not hereinbefore specifically referred to, reference should be had to the accompanying drawings and descriptive matter, in which I have illustrated and described preferred embodiments of the invention.

Of the drawings:

Fig. 1 is a front elevation of a recording potentiometer;

Fig. 2 is a plan view of the instrument shown in Fig. 1;

Fig. 3 is a section on the line 3—3 of Fig. 2;

Fig. 4 is another view taken similarly to Fig. 3, but on a larger scale, and with parts broken away and omitted to better illustrate the parts shown;

Fig. 4a is a partial section on the line 4a—4a of Fig. 4;

Fig. 5 is a perspective view showing a portion of the secondary pointer and associated parts;

Fig. 6 is a partial section on the line 6—6 of Fig. 2;

Fig. 7 is a partial section on the line 7—7 of Fig. 6;

Fig. 8 is a view taken similarly to Fig. 3, but with parts broken away and removed to facilitate the illustration of the parts shown;

Fig. 9 is a partial section on the line 9—9 of Fig. 8;

Fig. 10 is another view taken similarly to Fig. 3, but on a larger scale, and with parts broken away and omitted to better illustrate the parts shown;

Fig. 11 is a plan view of the parts shown in Fig. 10.

Fig. 12 is a view taken similarly to Fig. 10, but on a smaller scale and showing a portion only of the mechanism of Fig. 10, and with parts in different relative positions;

Fig. 13 is a partial section on the line 13—13 of Fig. 2;

Fig. 14 is an elevation of a portion of the apparatus shown in Fig. 13 and associated contact controlling parts;

Fig. 15 is a view taken similarly to Fig. 3 illustrating the combination of control provisions with the meter shown in Figs. 1 to 14;

Fig. 16 is a perspective view illustrating certain details of the control mechanism shown in Figs. 15 and 17;

Fig. 17 is a diagrammatic perspective further illustrating the construction and operation of the apparatus shown in Figs. 15 and 16;

Fig. 18 is a view taken similarly to Fig. 3 illustrating another form of meter and control provisions combination with numerous points of the meter mechanism shown in Fig. 3 omitted for purpose of clarity;

Fig. 19 is a view similar to Fig. 18 but the parts in different relative positions;

Fig. 20 is a rear elevation of parts shown in Fig. 19; and

Fig. 21 is a diagram illustrating meter and control circuits.

In Figs. 1 to 14 of the drawings, I have illustrated a recording potentiometer comprising a galvanometer B and mechanical relay provisions controlled by the deflection from its neutral position of the galvanometer pointer B' and comprising a motor $G^5$ or analogous source of power, for periodically giving rotative movements, varying in magnitude and direction with the deflections of the pointer B' to a shaft K through which corresponding adjustments are imparted to potentiometer resistance adjusting means, and to exhibiting means comprising an indicator index NA and a recorder marking element N by which a record of the values of the quantity or quantities measured is formed on a travelling record strip $m$. In the general features just referred to, the recording potentiometer shown in Figs. 1 to 14 does not differ in principle from instruments now and heretofore in use, but as already indicated, the instrument shown in Figs. 1 to 14 comprises many novel features of construction, arrangement and operation hereinafter described.

The instrument shown in Figs. 1 to 14 comprises a main housing or framework A, with a portion A' forming a supplementary housing for the instrument galvanometer B, its pointer B', and the portion of the primary selector mechanism or relay control mechanism directly cooperating with the meter pointer B'. The primary selector mechanism comprises a selector table or pointer engaging member C, and supporting arms C' secured on an oscillating shaft E. The parts C and C' are formed advantageously, and as shown, from a single piece of sheet metal. The table part C extends transversely to, and normally has its pointer engaging portion below the plane of oscillation of the pointer B'. In its neutral position the pointer B' is directly above a horizontal central or neutral portion CO of the upper edge of the table part C.

The upper pointer engaging edge of the table C is inclined to the plane of pointer movement, and preferably, as shown, is shaped to provide a set of horizontal pointer engaging shoulders CH at the high side of the neutral point or shoulder CO, and a corresponding set of horizontal shoulders CL at the low side of the point or shoulder CO. When permitted to do so, as hereinafter explained, the table C moves upward until one or another of the shoulders CL, CO, CH depending on the position of the pointer B', engages the latter. On such engagement, the upward movement of the table is arrested by the pointer B' which then engages an abutment A². The latter advantageously, and as shown, is in the form of a scale bar mounted in the housing A' in front of a window glass A³ through which the position of the pointer relative to the scale A² may be visually observed. The extent of movement of the table C toward the plane of the pointer B', and thereby the angular movement imparted to the shaft E when the table moves into engagement with the pointer, obviously depends upon which one of the steps CL, CO, CH then engages the pointer, and determines the setting then given to a so-called secondary pointer or selector member $e$ actuated by the shaft E as hereinafter described. Advantageously and as shown, the steps CL and CH adjacent the neutral point or shoulder CO are arranged so that small deflections of the galvanometer pointer B' in either direction from its neutral position will produce relatively large and proportional, or approximately proportional angular changes in the position of the member C when the latter is in engagement with the galvanometer pointer B'. This contributes to rapid and accurate rebalancing of the potentiometer. To this end, as shown, the steps CL and CH adjacent the neutral point CO are arranged in an approximately straight row more steeply inclined to the plane of pointer deflection than are the extensions of said row, along which are arranged the remaining shoulders CL and CH.

Ordinarily, or at least frequently, when the galvanometer pointer is engaged by one or another of the shoulders CL and CH, shown as forming a part of the approximately straight row of such shoulders, the potentiometer may be rebalanced by the single following rebalancing operation. When the deflection of the galvanometer from its neutral position is greater, so that the latter is engaged by one of the shoulders CL or CH beyond one or the other of the ends of said straight row of shoulders, two or more rebalancing operations are ordinarily necessary to rebalance the potentiometer, and the exact angular position of the member C is then less important. The described arrangement permits of a practically suitable angular adjustment of the member C for the full range of angular deflection of the pointer B' without unduly increasing the extent of the member C in the direction of its angular movement.

To reduce the stresses impressed upon the pointer B' by the table C, and to prevent deflection of the pointer about its normal axis of deflection while the table C is moving into and out of engagement with the pointer, I advantageously provide a pointer locking and supporting member D. The latter as shown, is formed of sheet metal and comprises arm portions loosely journalled on the shaft E and connected by a cross-bar portion D' normally slightly beneath the plane of deflection of the pointer B', and also connected by a bar-like portion D² normally slightly above said plane. The member D also comprises a depending arm D³ terminating in an out-turned portion D⁴. The table C, when in its normally depressed position shown in dotted lines in Fig. 6, engages the part D⁴ and thereby holds the member D in a normal position in which neither the portion D' nor the portion D² engages the pointer B'. As soon as the table C starts to move upward from its normally depressed position the table D is released and turns under the action of gravity into the position in which the bar D' engages the pointer B' and moves the latter into engagement with the abutment A². When such engagement occurs the pointer B' is in or near engagement with the bar D², so that the latter is effective to prevent any appreciable bending of the pointer B' due to the subsequent impact against the latter of the table C. Adjustable counter-weights D⁵ may be mounted on arm portions of the member D at the rear of the shaft E to regulate the gravital force acting on the member D and tending to move the latter into engagement with the pointer. When the table C drops back, the member D moves down with it. The bar-like portion D² then strikes the pointer B' lightly, and jars the latter loose from contact with the lower edge of the abutment A² if, as occasionally happens, the pointer B' sticks to said abutment. The pointer sticking tendency referred to, which develops from time to time, is apparently due to the formation of sticky condensate from fumes or vapor in the atmosphere enveloping the instrument in some uses of the latter, particularly in the vicinity of metallurgical furnaces or like apparatus, resulting in an atmosphere containing vapors or fumes.

The means for periodically holding the table C and thereby the pointer locking member D in their depressed positions, and for periodically releasing them to permit their engagements with the pointer B', comprise a power actuated member shown as a lever F pivoted on a fixed pivot pin A⁵ carried by an end plate portion A⁴ of the instrument framework. The lever F is normally held by a spring F² in the position in which a projection F' of the arm F, shown as extending through a slot A⁶ in the plate A⁴, engages a projection E² on a lever arm E' secured to the shaft E, thereby holding the latter in the position in which the table C and locking member D occupy their depressed positions. At suitable intervals varying with conditions for which the instrument is designed or adjusted from ten seconds or so up to a minute or two each, the arm F is turned about the pivot pin A⁵ to move the projection F' away from the projection E² and thereby permit the shaft E to rotate under the action of gravity into the position in which the table C engages the pointer B'. The means for thus periodically moving the lever F out of its normal position comprises a pin G' carried by a cam disc G secured to a shaft G², which rotates continuously in the clockwise direction as seen in Fig. 3. The latter is connected by speed reducing gearing shown as including a transverse shaft G³, with the armature shaft G⁴ of a motor G⁵ forming the relay motor or power actuator of the instrument.

The secondary pointer $e$ is so connected to the shaft E that it tends to share all angular movements of the shaft, but may be held against angular movement without preventing the movement of the shaft E effected by the engagement of the projection E² of the arm E' by the projection F' of the lever F, when the latter is being returned to its normal position. To this end the secondary pointer $e$, which may be made of wire, has its upper end formed into a loop $e^2$ loosely encircling the shaft E, and is connected intermediate its end to a spring E⁴ tending to hold the pointer $e$ against a shoulder or abutment portion E³ of the arm E'. The spring E⁴ yields to permit the shoulder E³ to move away from the pointer $e$ when the latter is held as hereinafter described. As shown, the loop portion $e^2$ of the secondary pointer $e$ is elongated to permit of a bodily movement of the pointer $e$ carrying its lower end $e'$ toward and away from the axis of the shaft E.

The end portion $e'$ of the secondary pointer $e$ extends through a slot A⁷ in the frame plate A⁴ in position to be engaged by the mechanism periodically actuated by the motor G⁵ to effect potentiometer balancing adjustments and corresponding indicator and recording adjustments, when the meter pointer B' is displaced from its neutral position and the secondary pointer $e$ is correspondingly displaced from its neutral position during any engagement of the table C with the pointer B'. The mechanism shown for effecting the potentiometer balancing and the indicator and recorder adjustments comprises a shaft L carrying potentiometer resistance adjusting means, and a winding drum L² for the cable L³⁰ employed to adjust the carriage $n$ which controls the position of the indicator and recorder parts NA and N, a shaft K geared to the shaft L, and mechanism for periodically giving the shaft K angular adjustments, the extent and direction of each of which depends on the then position of the secondary pointer $e$.

The mechanism for giving the shaft K its angular adjustments, is shown best in Figs. 3, 4 and 4a, and comprises a selector lever H fulcrumed on a supporting pivot A⁸, and urged by a spring H' toward a position in which a projection or shoulder H² of the lever H engages the peripheral edge of the constantly rotating cam disc G. The contour of the latter is shaped to give the lever H timed movements toward and away from the shaft K as is hereinafter more fully described. The lever H is formed with oppositely inclined serrated or stepped jaws H³ and H⁴, one or another of which engages the end portion $e'$ of the lever $e$ once for each rotation of the cam G, unless at the time when such engagement would otherwise be effected the pointer $e$ occupies its neutral position in which case the pointer end $e'$ passes into a notch H⁵ formed in the lever H between the jaws H³ and H⁴.

Cooperating with the lever H are two pawl controlling levers HH and HL, each of which is pivotally supported on the stud A⁸ and is normally urged by a corresponding spring H¹⁰ toward the lever H. The turning movements about the pivot pin A⁸ permitted by the levers HH and HL are very slight and are limited by the engagement of the levers with the hub portions IH' and IL' of pawl members IH and IL, respectively. Said hub portions loosely surround the shaft K and are received in curved seats HH' and HL' formed in the levers HH and HL, respectively.

When in the rotation of the cam disc G, the projection H² of the lever H is permitted to move inward along the cam edge portion $g^0$, the end $e'$ of the secondary pointer if the latter is then displaced from its neutral position, is clamped between one or another of the jaws H³ and H⁴ and one or the other of the pawl controlling levers HL and HH. The lever HH is thus engaged when the pointer $e$ is at the high side of its neutral position and is engaged by one of the shoulders of the jaw H⁴, while the lever HL is so engaged when the pointer $e$ is at the low side of its neutral position and is engaged by one of the shoulders of the jaw H³. When the lever HH is thus engaged it is moved sufficiently to shift the pawl member IH from a normal inoperative position into an operative position with the result that it then imparts an angular adjustment in the counter-clockwise direction to the shaft K. Conversely, the movement imparted to the lever HL by the pointer end $e'$, when the latter is at the lower side of neutral and is engaged by the jaw H³ of the lever H, moves the pawl member IL from a normal inoperative position into an operative position with the result that the shaft K is then given a rotative movement in the clockwise direction.

The pawl members IL and IH are each pivotally connected to a stud J' carried by an oscillating member J. The member J is mounted on the shaft K and is oscillated about the latter by connections from the cam disc G, comprising a lever JA mounted on and oscillated about the shaft K by a link J² connecting the lever JA to a crank pin G⁶ carried by the cam disc G. Advantageously, and as shown, the members J and JA are not rigidly connected together, but are connected by a spring J³ tending to hold the member J rigidly against a projecting portion JA′ of the member J but yielding to permit either of the pawl members IL and IH to cease oscillation when its continued oscillation would tend to adjust the shaft K beyond its normal range of adjustment.

The pawl member IH is provided with a pawl portion IH² adapted to engage a toothed disc KH loosely mounted on the shaft K, and rotate said disc in the clockwise direction as seen in Fig. 3 on a corresponding movement of the pawl member IH during any period in which the secondary pointer end portion $e'$ is gripped between the jaw H⁴ of the lever H and the pawl controlling lever HH. The pawl portion IH² so engages the disc KH when such gripping action occurs because the slight turning movement in the counter-clockwise direction as seen in Fig. 3 given to the lever HH by said action moves a projection HH² of the lever HH against an arm portion IH′ of the pawl member IH, and thereby tilts the latter into the position in which its pawl portion IH² engages the toothed periphery of the disc KH. Similarly, when the secondary pointer end $e'$ is gripped between a shoulder on the jaw H³ of the lever H and the lever HL, the latter is oscillated sufficiently to bring its arm portion HL² into engagement with an arm IL² of the pawl member IL and thus brings the pawl portion IL² of the member IL into engagement with the toothed periphery of a disc KL secured to the shaft K. The bores of the hub portions IH¹⁰ and IL¹⁰ of the pawl members IH and IL are shaped to permit the angular adjustments of the pawl members about the pivot pin J′ required to move the pawl portions IH² and IL² into and out of engagement with the discs KH and KL, respectively. In the particular construction shown each of the levers HH and HL, when in its normal depressed condition, cams the corresponding pawl member hub portion IH¹⁰ or IL¹⁰, respectively, toward the shaft K, and thereby holds the corresponding pawl portions IL² or IH² out of its disc engaging position.

As previously stated, the disc KL is rigidly connected to the potentiometer adjustment shaft K, whereas the disc KH is free to turn about that shaft. The two discs are geared together, however, so that rotation of either disc requires a rotation in the opposite direction of the other disc. In consequence, rotation of the disc KH in the clockwise direction produces a rotation of the disc KL and thereby of the shaft K in the counter-clockwise direction. The gearing shown for thus connecting the discs KL and KH comprises a compound gear K′ and an elongated gear K² each turning about a stationary pivot pin. The gear K′ is in mesh with the disc KH and with the gear K², and the latter is also in mesh with the disc KL. Preferably the discs KH and KL and gears K′ and K² have fine teeth and these may well be formed by knurling action. The various members JA, J, IH, KL, and HH mounted on the shaft K at the outer side of the frame plate A⁴ are advantageously spaced apart by suitable washers or collar parts K³.

It is to be noted, however, that the thin sheet metal relay and control parts of the compact, actual instrument are spaced much more closely together than they appear to be in some of the drawings and particularly in Fig. 4a, wherein the lateral spacing of the parts is exaggerated to make the drawing easier to read for clarity. In the actual instrument, for example, the horn portion H¹¹ of the lever H serves as a guide with relatively small clearances between its sides and the sides of the adjacent portions of the levers HH and HL.

The edge of the cam G against which the spring H⁷ tends to hold the shoulder H² of the lever H, is formed with portions at different distances from the axis of the shaft G². During a portion of each rotation of the cam G, the edge portion $g^5$ thereof most remote from the shaft G engages the shoulder H² and holds the lever H in its fully retracted or depressed position beneath the path of movement of the end $e'$ of the secondary pointer $e$. The portion $g^6$ of the cam edge immediately following the portion $g^5$ (see Fig. 10), leads inward to the cam edge point $g'$ nearest the shaft G². As the edge portion $g^6$ moves past the shoulder H², the lever H rises until the shoulder engages the cam edge point $g'$ if the secondary pointer $e$ happens to be in its neutral position so that its end $e'$ enters the lever notch or recess H⁵, but if the pointer $e$ is not then in its neutral position, the rising movement of the lever H is interrupted whenever one or another of its shoulders H³ and H⁴ engages the end $e'$ of the pointer $e$. Such engagement results in a temporary separation between the shoulder H² and the edge of the cam G and also results, as previously explained, in a movement imparted to the corresponding lever HH or HL which causes the corresponding pawl IH or IL to be thrown into operative relation with the gear wheel KH or KL to which the pawl pertains.

The period of each pawl actuation, initiated as described, is terminated by the re-engagement of the edge of the cam with the shoulder H² of the lever H and the resultant depression of the latter, and each such period of actuation is longer or shorter depending on whether the shoulder H³ or H⁴ engaging the secondary pointer $e$ is remote from, or near to, the neutral notch H⁵. This proportioning of each period of pawl actuation to the displacement from neutral of the secondary pointer initiating the actuation, is secured by progressively increasing the distance between the axis of the shaft $G^2$ and the edge of the cam G as the distance along that edge from the point $g'$ increases backward, having reference to the direction of rotation of the cam. Advantageously, and as shown (see Fig. 10) the distance between the shaft G increases continuously along a portion $g^2$ immediately to the rear of the point $g'$ and thereafter increases in a series of more or less abrupt steps $g^3$ each lying at opposite sides of cam edge portions $g^4$ concentric with the shaft $G^2$. To further magnify the extent of pawl actuation produced by a step $H^3$ or $H^4$ relatively remote from the neutral recess $H^5$ of the lever H, as compared with that produced by a step or shoulder less remote from that recess, the angular distance between adjacent shoulders $g^3$ progressively increases as the distance from the point $g'$ increases, and the inclination of the tangent to the edge portion $g^2$, at any point along the latter, to the radial line running from the axis of the shaft $G^2$ to said point, progressively decreases as the distance of the point last mentioned from the point $g'$ increases. The resultant increase in the rate of increase of potentiometer rebalancing effect produced by an increase in galvanometer displacement contributes to speedy and accurate potentiometer rebalancing without objectionable overbalancing or hunting.

The rotation of the shaft K rotates a vertical potentiometer resistance adjusting shaft L through gearing comprising a beveled gear $K^4$ secured to the shaft K and a beveled gear $L'$ splined on the shaft L. In the form shown, an upper barrel-like portion $L^2$ of the gear $L'$ serves as a winding drum or windlass element about which the cable $L^{30}$ for adjusting indicator and recorder parts is wound, and by which the cable is moved when the gear $L'$ is rotated.

The gear $L'$ comprises a lower hub portion $L^3$ journalled in the framework of the instrument, and formed with slots $L^4$ receiving the ends of a key or pin $L^5$ carried by the shaft L which is thus splined to the gear wheel $L'$, so that the shaft L may be depressed for a purpose hereinafter described without interfering with the capacity of the gear to rotate the shaft. Normally the shaft L is held in the elevated position shown in Fig. 12, by a spring $L^6$ acting between a collar $L^7$ secured to the shaft L and a cover plate $L^8$ for the upper end of the cavity formed in a cup-shaped rheostat housing member $L^{10}$. The lower portion of the shaft L is mounted in a stationary tube or bearing sleeve $L^{11}$ mounted in and projecting through the bottom wall of the cavity in the member $L^{10}$. The member $L^{10}$ is secured to the instrument framework, as by means of clamping screws $L^9$, and advantageously is formed of moulded bakelite or like insulating material.

The member $L^{10}$ comprises a body portion of cylindrical outline in which are formed two side by side helical grooves. The main potentiometer slide wire resistance RA, is received in one of said grooves, and a second slide wire resistance RB is received in the other groove of the member $L^{10}$. Advantageously, each of the resistances RA and RB consists of a wire wound into a helix with closed spaced turns.

Potentiometer balancing adjustments are effected by adjusting a bridging contact $L^{15}$ connecting adjacent portions of the resistances RA and RB lengthwise of those resistances. The contact $L^{15}$ is carried by a sort of a threaded nut or collar $L^{14}$. As shown, the contact carrier $L^{14}$ is formed by severing a ring of bakelite or other suitable insulating material at one side and securing the contact $L^{15}$ to the severed portions so as to hold the latter apart and thus to convert the severed ring into one turn of a helix of such pitch that its inner edge engages the periphery of the body portion of the member $L^{10}$ between the grooves receiving the conductors RA and RB, the latter forming the walls of a screw thread or helical groove. In consequence, when the contact carrier $L^{14}$ is rotated about the axis of the member $L^{10}$, the bridging contact $L^{15}$ moves along the length of the resistances RA and RB spirally about the axis of the shaft L. The contact carrier $L^{14}$ is rotated and permitted the necessary movement parallel to the axis of the member $L^{10}$, by means of a yoke member $L^{12}$ secured to the lower end of the shaft L and having uprising arms $L^{13}$ parallel to the shaft L and passing through opening formed for the purpose in the contact carrier $L^{14}$.

A portion of the member $L^{10}$ below the conductors RA and RB is formed with circumferential grooves receiving resistances RC and RD for regulating the energizing voltage impressed on the potentiometer circuit. The resistances RC and RD are shown as formed of resistance conductor helices received in the corresponding grooves in the member $L^{10}$. The portions of these resistances in circuit may be varied by adjustment of a bridging contact $L^{16}$ angularly about the axis member $L^{10}$. As shown, the contact $L^{16}$ is carried by a member $L^{17}$ in the form of a gear wheel journalled on a tubular portion of the rheostat housing $L^{10}$ surrounding the lower end of the bearing sleeve $L^{11}$. Attached to the gear wheel $L^{17}$ and at the upper side of the latter is another gear wheel $L^{18}$.

The gear wheel $L^{18}$ may be manually adjusted to thereby angularly adjust the contact $L^{16}$, by the depression and rotation of a shaft $L^{19}$ mounted in the member $L^{10}$ and provided with an operating knob at its upper end, and carrying a spur gear $L^{20}$ at its lower end. Normally a spring $L^{21}$, acting between the cover plate $L^8$ and a collar on said shaft, holds the latter in the position shown in Fig. 13 in which the gear $L^{20}$ is above the plane of the gear $L^{18}$. On the depression of the shaft $L^{19}$, the gear $L^{20}$ meshes with the gear $L^{18}$, and the rotation of the shaft then angularly adjusts the contact member $L^{16}$ to vary the resistance in the potentiometer energizing circuit as may be required, for example, to compensate for variations in the voltage of the potentiometer energizing battery.

To permit of the automatic adjustment at suitable time intervals of the portions of the resistances RC and RD in circuit, means are provided for periodically connecting the gear $L^{17}$ to the shaft L. This is effected in the construction shown by depressing the shaft L to thereby bring a spring clutch finger $L^{22}$ carried by one of the yoke arms $L^{13}$, into engagement with the teeth of the gear $L^{17}$. The means shown for automatically depressing the shaft L for this purpose comprises a lever $L^{23}$ pivoted on a stationary fulcrum pin $A^{20}$, and serving, when turned in the clockwise direction as seen in Fig. 14, to engage the collar $L^7$ and thereby depress the shaft L sufficiently to bring the finger $L^{22}$ into engagement with the gear $L^{17}$. The lever $L^{23}$ is oscillated at regular time intervals through connections shown as comprising a cam $M^{21}$ cooperating with the lever $L^{23}$ and conveniently mounted on the hereinafter described feed roll shaft $M^{20}$, a second cam $M^{22}$ carried by said shaft $M^{20}$, a lever $L^{25}$ pivoted on the shaft or pin $A^{20}$ and engaged by the cam $M^{22}$, and a spring $L^{24}$ connecting the levers $L^{23}$ and $L^{25}$. The spring $L^{24}$ normally holds a projection $L^{26}$ on the lever $L^{25}$ in an engagement with the lever $L^{23}$.

Except at intervals determined by the speed of rotation of the shaft $M^{20}$, the lever $L^{23}$ exerts no downward thrust on the collar $L^7$ carried by the shaft L. When, however, the rotation of the shaft $M^{20}$ permits the transversely projecting end of the lever $L^{23}$ to move towards the shaft $M^{20}$ along the face of a shoulder $M^{210}$ of the cam $M^{21}$, the spring $L^{24}$, which is then under tension, throws the lever $L^{23}$ in the clockwise direction, as seen in Fig. 14, and depresses the shaft L and thereby connects the shaft through the spring finger $L^{22}$ and gear wheel $L^{17}$ to the contact carrier $L^{14}$. To permit this action, the spring $L^{24}$ exerts a force when under tension sufficient to effect the necessary compression of the spring $L^6$. Shortly after the lever $L^{23}$ is thus turned to depress the shaft L, the continued rotation of the shaft $M^{20}$ permits the lever $L^{25}$ to move along the face of a shoulder $M^{220}$ on the cam $M^{22}$ towards the shaft $M^{20}$ until the projection $L^{26}$ of the lever $L^{25}$ engages the lever $L^{23}$. When this occurs, the spring $L^4$ no longer tends to compress the spring $L^6$, and the latter then raises the shaft L and thereby disconnects it from the gear $L^{17}$. As the cams $M^{21}$ and $M^{22}$ continue to rotate, the transverse end portions of the levers $L^{23}$ and $L^{25}$ are spread apart by the cams and the spring $L^{24}$ is again put under tension preparatory to a repetition of the described operation. As shown, the cams $M^{21}$ and $M^{22}$ are arranged to depress the shaft L twice during each rotation of the shaft $M^{20}$.

The manual depression of the shaft $L^{19}$ or the automatic depression of the shaft L separates a switch contact $L^{27}$ from a switch contact $L^{28}$ with which it normally is in engagement and moves the contact $L^{27}$ into engagement with a contact $L^{29}$ from which it is normally separated. This result is obtained by providing the contact $L^{27}$ with an insulated extension $L^{270}$ engaged and depressed by a collar $L^{70}$ on the shaft L when the latter is depressed, and by a collar $L^{190}$ on the shaft $L^{19}$ when the latter is depressed. The purpose of thus adjusting the switch blade 27 is to connect a standard battery to the terminals of the galvanometer, and thereby makes it possible to determine how the portions of the resistances RC and RD in circuit should be varied in recalibrating the apparatus.

To prevent over-travel of the winding drum $L^2$ and shaft L in either direction, the instrument is provided with means for limiting the range of rotative movement in either direction of the shaft K. The provisions shown for this purpose comprise a threaded extension $K^5$ of the shaft K, and a sliding nut $K^6$ on said extension, which is held against rotation by the engagement of a flat side of the nut with a bearing surface $A^{22}$ formed on the instrument framework. The threaded portion $K^5$ of the shaft K carries limit pins $K^{50}$ and $K^{51}$ on opposite sides of the nut $K^6$ which engage with projections from the side of the nut shown as formed by the ends of a pin $K^{60}$ passing through the nut when the latter is moved by the rotation of the shaft K into the position corresponding to one end or the other of the desired range of rotative movement permitted the shaft K. Detachably connected to the housing body portion $L^{10}$ as by a threaded engagement, is a cup-shaped casing section LA. The latter is advantageously formed of glass, as indicated in the drawing, and unites with the casing body to form a transparent dust proof enclosure for the resistors RA, RB, RC and RD and the contacts cooperating therewith. Advantageously, the casing section LA contains oil, in which the slide wire resistors and contacts are submerged and are thereby protected against corrosion to which said resistors and contacts are otherwise frequently subject under the conditions of use of an instrument of the character disclosed. The resistance housing and adjusting provisions shown in Figs. 13 and 14 are not claimed herein, but are claimed in my co-pending application Serial No. 431,173, filed February 25th, 1930, as a continuation in part of this application.

The record sheet $m$ on which the record marking element N makes record impressions is drawn from a supply roll M' at a regulated speed by a feed roll M which serves as a platen in the record forming operations, and mechanism now to be described by which the roll M is intermittently rotated by a main relay motor $G^5$. Connected to the shaft $M^{20}$ of the roll M at one end of the latter is a driving gear $M^2$ in mesh with and driven by a worm $M^3$, the shaft of which is connected to a ratchet wheel $M^4$. The latter is intermittently advanced by a pawl $M^5$ connected to a ratchet lever $M^6$. The latter is intermittently turned to advance the wheel $M^4$ and thereby the feed roll M once during each rotation of the cam disc G, by a link $M^7$ connecting the ratchet lever $M^6$ to a lever $M^8$ pivoted on the stud $A^5$. The lever $M^8$ has a projection $M^9$ engaged by the left-hand edge of the lever F as seen in Figs. 3 and 8, when the latter is turned in the counter-clockwise direction by the pin G' carried by the cam disc G.

The parts are so arranged that the projection $M^9$ tends to remain in contact with the lever F during the return movement of the latter afer the pin G' moves out of contact with it. The return or counter-clockwise movement of the lever $M^8$ is limited, however, by the engagement of the lever with an adjustable stop $M^{10}$ shown as a pin adapted to be inserted in one or another of a series of holes $A^{14}$ in the frame plate $A^4$. By shifting the pin stop $M^{10}$ from one to another of the holes $A^{14}$ the extent of movement imparted to the lever $M^8$, and thereby to the feed roll M, on each rotation of the cam disc G may be adjusted to increase or decrease the speed at which the record strip $m$ is advanced.

The marking element N is normally held in an elevated position, but is intermittently lowered to make record impressions on the record strip $m$ by the oscillation of a shaft N' on which the marking element N is splined and which forms a guide for the carriage $n$ by which the marking element N is moved transversely of the record strip along the shaft N' as the potentiometer is rebalanced to compensate for changes in the value of the quantity measured by the instrument. In the normal elevated position of the marking element N a projection NA carried by the marker N forms an index cooperating with a stationary scale $A^{15}$ carried at the front of the instrument to visually indicate the value of the quantity measured. In practice the shaft N' is advantageously square in cross section, and the marking element N is advantageously formed of sheet metal shaped to provide a passage square in cross section through which the shaft N' extends. The carriage $n$ is so mounted on the shaft N' as not to share in the oscillatory movements of the latter. The ends of the cable $L^{30}$ wound about the drum portion $L^2$ of the gear L lead about guide rolls $L^{31}$ and are connected to the opposite ends of the carriage $n$, so that when the gear is rotated clockwise, the carriage $n$ is moved toward the right or high side of the record strip.

The angular position of the shaft N' is controlled by an arm $N^2$ and control lever $N^4$ and link $N^3$ connecting the lever $N^4$ to the arm $N^2$. The lever $N^4$ is so disposed that when free to do so it will turn under the action of gravity and thereby impart record impression movements to the shaft N' and marking element N, but normally the lever $N^4$ is locked in the position in which the marking element N is held in its elevated postion by a latch bar $N^5$. The latter is pivoted on the stud $A^{11}$ carried by the frame plate $A^4$. As shown the arm $N^2$ and lever $N^4$ are located at opposite sides of the frame plate $A^4$, and the link $N^3$ is connected to the lever $N^4$ by an off-set end portion extending through an opening $A^9$ in the frame plate $A^4$.

In the instrument shown, the frequency at which record impressions are made depends upon the condition of the potentiometer as to balance. The mechanism by which this result is attained and which is now to be described operates when the potentiometer is unbalanced to delay the formation of a subsequent record impression until stable balance is again attained or until a considerable number of rebalancing operations have occurred.

A spring $N^{50}$ coiled about the supporting pivot $A^{11}$ for the latch lever $N^5$ normally holds the latter and locks the control lever $N^4$ in its elevated inoperative position. From time to time the latch lever $N^5$ is turned about its pivot $A^{11}$ to unlock the lever $N^4$ and thereby permit the marker N to make a record impression by means of a trip lever O. The latter is pivoted on a stud $A^{12}$ carried by the frame plate $A^4$, and is provided at one end with a pin O' which extends above the latch $N^5$ and pulls the latter down to release the lever $N^4$ when the lever O turns in the counter clockwise direction. When the lever O turns in the clockwise direction a projection $O^6$ therefrom engages the lever $N^4$ and returns the latter into the position in which it is engagd by the latch lever $N^5$. The lever O is normally held by a spring $O^5$ in the position in which the lever $N^5$ locks the lever $N^4$ in the marker inoperative position, but is intermittently moved to release the latter from time to time, by a lever OA also mounted on the pivot pin $A^{12}$ and given oscillatory movements of regular frequency by a pin G' carried by the cam disc G. The oscillation of the lever OA imparts oscillatory movements to the lever O only when the lever O is connected to the lever OA by a latch part $O^8$.

The latter is connected to the lever O by a pivot pin $O^2$ and is adapted to engage a projection $OA'$ carried by the lever OA to thereby connect the levers O.

Normally the latch hook $O^3$ is gravity held out of engagement with the projection $OA'$ but is moved into engagement therewith at the proper times, by a finger $OB'$ projecting from one side of a segmental ratchet wheel OB. The latter is pivoted on a stud $A^{13}$ carried by a frame plate $A^4$ alongside a generally similar segmental ratchet wheel OC formed with a slot $OC'$ through which the finger $OB'$ projects. The ratchet wheel OB may be turned counter-clockwise to engage and tilt the latch $O^3$ as a result of movements imparted to the ratchet OC or by a separate actuating mechanism depending on conditions of operation.

The ratchet wheel OC is advanced from an initial position in which its shoulder $OC^2$ engages a stop pin $A^{14}$ through an angular distance corresponding to the distance between adjacent ratchet teeth, once for each rotation of the cam disc G, as a result of the oscillatory movement hereby imparted to by the lever OA which has a spring pawl $OA^2$ engaging the ratchet teeth on the wheel OC. The step by step movements of the ratchet disc OC away from its initial position have no effect on the wheel disc OB, until the rear wall of the slot $OC'$ is brought into engagement with the finger $OB'$. Further advance movement of the disc $OC'$ necessarily results in a corresponding movement of the disc OB. When the movement is thus imparted to the wheel OB by the wheel OC, the finger $OB'$ engages the latch $O^3$ and turns the latter into operative engagement with the projection $OA'$ on the lever OA, so that the following tilting movement imparted to the lever OA by the pin $G'$ tilts the lever O about the shaft $A^{12}$, and thereby moves the latch bar $N^5$ out of engagement with the lever $N^4$, whereupon the marker N falls into engagement with and makes an impression on the record sheet $m$.

Pivotally mounted on the pin $O^2$ carried by the lever O, are pawls $O^4$. The latter in the position of the lever O, engage the ratchet teeth on the wheels OC and OB and prevent retrograde or clockwise motion of those wheels. When the lever O is tilted by the lever OA, however, the pawls $O^4$ are carried out of engagement with the ratchet wheels OB and OC, and the latter then return by gravity into their initial positions in which their respective shoulders $OB^2$ and $OC^2$ engage the stop pin $A^{14}$.

In each cycle of operation following the return of the wheels OB and OC into their initial positions, the successive movements of the wheel OC produce a record impression in the manner just described, only when delay is experienced in suitably rebalancing the potentiometer. Whenever in any such cycle, exact potentiometer meter balance is effected, and the rising movement of the lever H is not limited by the secondary pointer end $e'$ which then enters the slot $H^5$, a pawl OH pivoted to the lever H is permitted to engage the ratchet wheel OB and thereby advance the wheel OB by an angular distance corresponding to the distance between adjacent teeth on the wheel OB. The movement thus imparted to the wheel OB may cause the finger $OB'$ to engage the latch $O^3$ and thus effect a record impression in a fraction of the time required to produce that impression through the movements of the gear wheel OC. When the rising movement of the lever H is limited by the engagement of the secondary pointer end $e'$ with any of the steps on the lever jaws $H^3$ and $H^4$, the pawl OH does not engage the ratchet wheel OB but is then held away from the ratchet wheel by the arm $HH^3$ and $HL^3$ on the levers HL and HH, respectively.

The number of advance movements of the disc OC required to cause the latch $O^3$ to be adjusted by the finger $OB'$, and the number of movements which must be imparted to the wheel OB by the pawl OH to effect the same result, obviously depend on the proportion and arrangement of the parts. As shown twenty movements of the disc OC are required to bring the rear end of the slot $OC'$ into engagement with the finger $OB'$ and four more advance movements of the wheel OC are necessary to cause the finger $OB'$ to throw the latch OH into engagement with the projection $OA'$, while such engagement is effected by four movements imparted to the wheel OB by the pawl OH. With the construction disclosed whenever the wheel OB is given four advance movements by the pawl OH in any one cycle before the wheel OC is given twenty four movements by the pawl $OA^2$, the movements imparted to the wheel OB and not those imparted to the wheel OC determine the time required in that cycle for the actuation of the marker element N, and for the return of both discs OB and OC to their initial positions in which their shoulders $OB^2$ and $OC^2$ engage the stop pin $A^{14}$ which completes the cycle.

With the particular arrangement and proportioning described, therefore, the marking element N is actuated at least as often as once for every twenty-four revolutions of the cam disc G, and may be operated as often as every four revolutions of the cam disc G; and each actuation may require any number of revolutions of the cam disc G between four and twenty-four, inclusive. As already explained, the number of advance movements which must be imparted to either of the discs OB and OC to effect the described operations depends upon the form and proportions of the parts, which may be varied to fit operating conditions, or the whim or convenience of the designer.

While the marking element N might effect record impressions in other ways, advantageously such impressions are made as shown, by the aid of an inked ribbon $p$ or like transfer medium interposed between the marker N and the record strip $m$. As shown, the transfer ribbon $p$ is mounted on a transfer ribbon supporting frame comprising arms P located at the opposite ends of the machine and rigidly connected by a frame member $P^{10}$. The arms P are journalled on shafts $A^{12}$ carried by the end frame plate members $A^4$ and $A^{40}$. As shown, the ribbon $p$ leads from a spool $P^2$ journalled on the frame member P adjacent the plate $A^{40}$, to a spool P' journalled on the frame member P adjacent the frame plate $A^4$. The ribbon P in passing between the spools $P^2$ and P' passes over ribbon bending guides $P^3$ carried at the upper ends of the frame members P. To feed the ribbon and thus continuously present fresh portions to the action of the marking element N when the latter is located in its normal zone of operation, the spool P' is connected to a ratchet wheel $P^4$ (see Figs. 3 and 8). The latter is intermittently advanced by a pawl $P^5$ carried by a ratchet lever $P^6$ mounted on a point shaft $P^7$ carried by the corresponding frame member P and a cam MP connected to, and turning with, the feed roll M. With the cam MP of the contour and the length of the arm of the lever $P^6$ engaging the cam as shown, the slight ribbon shifting movements given the frame members P as hereinafter described, do not significantly affect the feeding movements of the ribbon spool P'. The lever $P^6$ is constantly urged into engagement with the cam MP by a spring $P^8$.

When, as is frequently desirable, the potentiometer instrument illustrated is intended to measure a plurality of quantities and to make readily distinguishable records of the quantities measured, advantageously the transfer ribbon comprises a plurality of longitudinal sections $p'$, $p^2$, $p^3$ impregnated with different colored inks, and mechanism is provided for shifting the ribbon transversely to its length to bring one or another of the sections $p'$, $p^2$, $p^3$ between the marking element N and the record sheet accordingly as a record of the value of one or another of said quantities is to be made. In an instrument in which the successive record impressions are made at time intervals which may vary as has been described, the lateral shifting movements of the transfer ribbon must be coordinated with the actuations of the marking element N.

Such coordination is effected in the instrument shown by utilizing the lever O as a means for shifting the transfer ribbon supporting frame in conjunction with a shift controlling mechanism comprising a cam disc Q journalled on a shaft $A^{16}$ journalled in the framework. The ribbon shifting or transfer cam Q is formed at its periphery with surface portions Q', $Q^2$, $Q^3$ at different distances from the the axis of the shaft $A^{16}$, which are engaged by a projection $p^5$ from the adjacent ribbon supporting frame arm P and thus serve to hold the different sections $p'$, $p^2$, $p^3$ of the transfer ribbon in operative relation with the marking element N during different operations of the latter. As shown the cam surfaces Q', $Q^2$ and $Q^3$ are so disposed that in one rotation of the cam Q the different ribbon sections will be presented for engagement by the marker N in the following order namely, $p'$, $p^2$, $p'$, $p^2$, $p^3$, $p^2$, $p'$, $p^2$, $p^3$, $p^3$, $p^3$, $p^2$. This permits readily distinguishable records of not less than six different quantities to be made with a transfer ribbon having three different colored sections $p'$, $p^2$ and $p^3$, as is fully set forth and explained in the patent of Grisdale No. 1,564,558, granted December 8, 1925.

The ribbon frame arm P turns under the action of gravity into the position in which the projection $p^5$ rests on one or another of the cam surfaces Q', $Q^2$ and $Q^3$, whenever the position of the lever O permits. In the normal position of the lever O shown in Fig. 10, however, the arm P is held in retracted position by the engagement of its projection $P^{20}$ with the arm O.

The cam Q is angularly moved at each actuation of the lever O by a pawl pivotally connected to the lever O through the pin O' and engaging the teeth of a ratchet wheel $Q^5$ coaxial with, and secured to the transfer cam Q. Associated with the transfer cam Q is a transfer switch QA which may be of known type and serves to connect the potentiometer circuit successively to the different energizing or measuring circuits pertaining to the different records formed. As shown, the transfer switch QA comprises an actuating shaft carrying a gear QA' in mesh with a driving gear carried by the shaft A. The switch QA need not be described or illustrated in detail, as various switch mechanisms suitable for the purpose are known, and particularly as the switch mechanism QA is shown as of the type disclosed and claimed in my prior Patent No. 1,770,918, granted July 22, 1930. A generally similar transfer switch QB is shown as mounted at the opposite end of the instrument from the switch QB. The switch QB forms no part of the measuring and recording apparatus proper, but cooperates therewith in the control instrument formed by the addition to the measuring apparatus of control provisions as hereinafter described.

The instrument shown in Figs. 1 to 14 may comprise, or be employed in conjunction with various potentiometer circuit arrangements. One potentiometer circuit arrangement of suitable and desirable form is illustrated diagrammatically in Fig. 21, which also shows a form of control circuit arrangement well adapted for use in one form of control system, in which the mechanism shown in Figs. 1 to 14 may advantageously be employed.

In the arrangement illustrated diagrammatically by way of example in Fig. 21, $Y'$, $Y^2$, $Y^3$, $Y^4$, $Y^5$ and $Y^6$ represent thermocouples respectively responsive to the temperatures of six different furnaces, or other devices responsive to changes in value of a multiplicity of different quantities or conditions to be successively measured in regular order by the measuring apparatus. As shown, each of the thermocouples $Y'$, $Y^2$, etc., has its negative terminal connected to a corresponding one of a set of stationary segments $q'$, $q^2$, $q^3$, $q^4$, $q^5$ and $q^6$ of the transfer switch QA, while the positive terminals of the various thermocouples are all connected to the switch member $L^{28}$, and thereby in the normal position of the switch member $L^{27}$, are connected to one terminal of the winding of the galvanometer B. The contacts $q'$, $q^2$, etc., are successively connected by a rotatable bridging contact $q^7$ carried by the shaft $Q^{10}$ of the transfer switch QA, to a stationary contact $q^8$ to which one terminal of the slide wire resistance RB is connected.

The slide wire resistance RB is connected by the bridging contact $L^{15}$ to the main potentiometer slide wire resistance RA. The latter is connected to the second terminal of the galvanometer B by means of a bridge comprising ratio arms including resistances R' and $R^2$, respectively, and third and fourth arms including resistances $R^3$ and $R^4$, respectively, through which the opposite terminals of the slide wire potentiometer resistance RA are connected to the terminals of the resistances R' and $R^2$, remote from the galvanometer. $R^5$ represents a resistance, which may be an ordinary galvanometer resistance through which the second terminal of the galvanometer is directly connected to the junction point of the ratio arms including the resistances R' and $R^2$.

The potentiometer is shown as energized by a battery $ba$ having its positive terminal connected through a resistance $R^6$ to the junction point of the bridge arms including the resistances R' and $R^3$. The negative terminal of the battery $ba$ is connected through a resistance $R^8$ to one terminal of the slide wire resistance RC. The latter, as previously explained, is connected by the bridging contact $L^{16}$ to the slide wire resistance RD, and one terminal of the latter is connected to the junction point of the bridge arms including the resistance $R^2$ and $R^4$. The resistances RC and RD are so arranged that the movement of the bridge contact $L^{16}$ in one direction diminishes the amount of each of the resistances RC and RD included in the potentiometer energizing circuit, while a movement of the contact in the opposite direction increases the portion of each of the two resistances included in the energizing circuit.

The movement of the bridging contact $L^{15}$ along the slide wire resistances RA and RB varies the relative portions of the resistance RA in the bridge arms including the resistances $R^3$ and $R^4$, and varies the amount of resistance RB in circuit. As shown, as the portion of the resistance RA in the bridge arm including the resistance $R^3$ is increased, the portion of the resistance RB in circuit is increased. The purpose of varying the amount of the resistance RB in circuit in the manner described is to maintain the galvanometer sensitiveness or deflection range approximately constant, by keeping the total amount of resistance in the galvanometer circuit approximately the same with the varying positions of the bridging contact $L^{15}$. To this end, the resistances are so relatively proportioned that the total bridge resistance between the resistance $R^5$ and the bridging contact $L^{15}$ is diminished when the portion of the resistance RA in the bridge arm including the resistance $R^4$ is diminished by an amount approximately equal to the corresponding increase in magnitude of the resistance RB in circuit. A standard battery $Sba$ has its positive terminal connected to the positive terminal of the battery $ba$, and has its negative terminal connected to the switch contact $L^{29}$. With the contact $L^{27}$ out of engagement with the contact $L^{28}$ and in engagement with contact $L^{29}$, the measuring apparatus may be calibrated by adjusting the bridging contact $L^{16}$ until the galvanometer B shows zero deflection. When this occurs the voltage drop through the fixed resistances R' and $R^6$ balances the voltage of the standard cell $Sba$. The resistance $R^7$ should be large enough to keep the current drain on the battery $Sba$ very small even though the strength of the current from the battery $ba$ is quite different, at the time of calibration, from its intended value.

To avoid the disturbing effects of temperature variations at the instrument, the resistances $R^2$, $R^3$ and $R^8$ are advantageously formed of nickel or other material having a positive thermal resistance co-efficient, while the other resistances, hereinbefore referred to, may be made of manganin wire or the like having an approximately zero thermal resistance co-efficient. The various resistances R' to $R^7$ inclusive, are advantageously mounted within the main cavity of the resistance housing $L^{10}$, beneath the removable cover plate $L^8$ with their terminals connected to terminal members $L^{50}$. The latter are attached to the housing $L^{10}$, advantageously by imbedding them in the housing, if the latter is made of moulded bakelite or analogous insulating material, as is preferable. The resistance $R^s$, which serves to compensate for the effect of temperature changes on the voltage of the battery $ba$, is advantageously located alongside the latter.

The general operation of the measuring and recording potentiometer instrument features hereinbefore referred to will be readily apparent, it is believed, from what has already been said. For convenience however, the operation may be summarized as follows: Once for each rotation of the relay actuated cam disc G, the pin G' carried by the latter engages the lever F and displaces the latter in a clockwise direction as seen in the various end views of the instrument. This permits the table C and pointer locking part D to engage the pointer galvanometer part B'. On such engagement of the table C with the pointer B' the secondary part $e$ is set into position dependent on which of the shoulders CL, and CO and CH of the inclined upper edge of the table C engages the pointer B'.

With the pointer $e$ thus set into a position corresponding to that occupied by the pointer B', the relay mechanism controlled by the position of the secondary pointer $e$ operates to adjust the potentiometer and marking element to re-balance the potentiometer, if the latter is out of balance. This adjustment is effected by the rising movement of the lever H which causes one or another of the shoulders on its stepped jaws $H^3$ and $H^4$ to engage the secondary pointer end $e'$, and through the latter imparts movements to one or the other of the pawl actuating levers HL and HH. The actuation of the pawl actuated lever HL causes the pawl member IL to impart movement to the toothed wheel KL and thereby to the shaft K which adjusts the potentiometer circuit so as to increase the galvanometer current and thus tend to restore the galvanometer pointer B' to its neutral position. The need for such potentiometer adjustment results from a decrease in the quantity measured and this decrease is indicated and recorded as a result of movements simultaneously imparted to the carriage $n$. Conversely, when the secondary pointer end $e'$ is gripped between a shoulder in the stepped jaw $H^4$ of the lever H and the pawl actuating lever HH, the pawl member IL moves the toothed wheel KH and thereby gives to the shaft K a movement opposite in direction to that produced by the direct actuation of the toothed wheel IL.

When the displacement of the secondary pointer from its neutral position is relatively large the pointer end $e'$ is engaged by a shoulder of the corresponding stepped jaw $H^3$ or $H^4$ relatively remote from the neutral recess $H^5$ the corresponding pawl member IL or IH then adjusted into an operative position is moved into an inoperative position by one of the cam shoulders $g'$, $g^2$, etc., analogously remote from the cam shoulder $g^0$, relatively late in the corresponding stroke of the pawl member oscillating element J, and in consequence the toothed wheel KL or KH engaged by the pawl member actuated, is given a correspondingly large turning movement. When the shoulder of the stepped jaws $H^3$ and $H^4$ engaged by the pointer end $e'$ is relatively close to the neutral notch $H^5$ the pawl controlling lever HL or HH is then moved into operative position and is thereafter returned to inoperative position relatively early in the corresponding oscillation stroke of the member J, and the resultant movement imparted to the wheel KL or KH is relatively small. When the secondary pointer is in its neutral position, its end $e'$ enters the notch $H^5$ in the lever H when the latter is raised and no adjustment of the potentiometer or recorder or indicator positions is then effected.

The mechanical relay mechanism through which the position of the secondary pointer $e$ effects adjustments of the shaft K, may be made adequately powerful and rugged, and at the same time quite compact, and is comprised of parts which, because of their shape and the slight and easy movements imparted to them, may be of light weight, and for the most part, may well be formed of sheet metal punchings. By the simple replacement of one or a few parts, a measuring instrument of standard design may be adapted to widely different conditions of use. For example, by the replacement of one cam disc G by another of different contour, the actual and relative extents of the movements imparted to the toothed wheels KL and KH, and thereby to the shaft K, by different deflections of the galvanometer pointer B', may be adjusted over wide ranges.

The manner in which the number of record impressions made on the record sheet $m$ is made dependent upon the time required for effecting exact re-balancing of the potentiometer circuit through the action of the gear wheel segments OB and OC and associated parts, has already been sufficiently described. The advantage of thus eliminating or minimizing the number of record impressions during periods in which those impressions do not show the values of the quantity of quantities measured with accuracy, without sacrifice of a desirable rapidity of record impression repetition during other periods will be readily apparent to those skilled in the art. It will be apparent to those skilled in the art, moreover, that the entire recording mechanism is characterized by its relative simplicity and reliability and effectiveness.

The pyrometer recording instrument shown in Figs. 1 to 14 inclusive, may be combined in a relatively simple and highly satisfactory manner with control mechanism for creating a controlling effect related or pertaining to the value of the quantity, or each of the quantities, measured by the instrument. For example, in one use for which the combined instrument is well adapted, the instrument regulates the heat supply to a furnace as required to maintain a work or furnace temperature which is measured and recorded by the instrument at an approximately constant value.

In Figs. 15 to 17 I have illustrated one form of the combined measuring, recording and controlling instrument which is characterized by numerous novel and useful features, and in particular is characterized by its capacity for producing control effects which may be more accurately proportioned to the necessities for such effects, as indicated by the variations in the value of the quantity measured, than have been practically obtainable heretofore, with instruments designed for the same general purpose.

The combined measuring and control instrument shown in Figs. 15 to 17 comprises a selective control element T and mechanism for making the operation of that element dependent upon the position of the carriage $n$ which corresponds to the departure from the normal or predetermined value of the quantity measured, and dependent also on the deflection of the galvanometer B' which corresponds to the momentary value of the quantity measured, and is a direct measure of the difference between said momentary value and the former value of the quantity measured which is indicated by the existing adjustment of the potentiometer and therefore, by the position at the time of the carriage $n$, said adjustment and carriage position being those effected at the last previously made potentiometer rebalancing operation. With the potentiometer accurately rebalanced at each rebalancing operation, the deflection of the galvanometer at any time is thus an accurate measure of any change in the value of the quantity measured which has occurred during the period between the time at which the deflection is observed and the time at which the potentiometer was last previously rebalanced. When the potentiometer is accurately rebalanced at equal time intervals, the galvanometer deflection at the time of initiating each rebalancing operation is therefore a direct measure of the rate of change in the value of the qauntity measured during the period between the last mentioned time and the time of initiating the last previously made rebalancing operation. Associated with the selective control element T is a relay controlling switch mechanism W for producing effects, the magnitude and direction of which are dependent upon the position of the selective control element T.

The control element T, shown in Figs. 15 to 17 may be described as a floating lever having its lower end pivoted at $S^2$ on a lever element S, which is periodically adjusted into an angular position directly dependent upon the then position of the secondary pointer $e$, and hence upon the position of the galvanometer pointer B'. As shown, the lever S is pivoted on the same shaft $A^8$ as the lever H, and tends to turn under the action of the spring $S^{100}$ into the position in which one or another of a series of stepped shoulders $SH^3$, $SH^2$, $SH'$, SO, $SL'$, $SL^2$ and $SL^8$ on the lever S will engage the transversely turned end $e'$ of the secondary pointer $e$, accordingly as the latter is then gripped between the lever H and one or another of the steps or shoulders of the lever HH and HL, or enters the recess $H^5$ in the lever H. On the retraction of the lever H the latter engages a shoulder $S^{10}$ on the lever S which is thereby retracted. A pin $G^8$ carried by the cam disc G and engaging a cam surface $S'$ on the lever S restrains the latter from moving towards the pointer $e$ for a brief period after the lever H to give the latter time to properly engage the pointer end $e'$.

Intermediate its ends, the lever T is connected to an arm $U^3$ pivotally mounted on a rock shaft $U'$ through which the angular position of the arm $U^3$ is made dependent, at a certain stage in each rotation of the cam disc G, upon the then displacement of the indicator and recorder adjusting carriage $n$ from a predetermined neutral or normal position of the latter. As shown, the element T is connected to the arm $U^3$ by a pin $U^4$ carried by the arm and working in a slot $T'$ in the element T.

The angular position of the shaft $U'$ and thereby of the arm $U^3$, is made periodically dependent upon the displacement from normal of the carriage $n$, by means of a control table U and a pointer $n'$ in the form of a pin projecting from the rear side of the carriage $n$. The table U is generally similar in form and in the manner in which it co-acts with the pointer $n'$, to the control table C and to the manner in which the latter coacts with the galvanometer pointer B'. As shown, the table U is formed of sheet metal with uprising ears $U^6$ apertured to receive the shaft $U'$, which passes through but is prevented from rotating in said ears by suitable connections between the shaft $U'$ and table U. Advantageously, the table U is in effect splined on the shaft $U'$, so that the table may be adjusted longitudinally of the shaft to change the temperature or other condition or value which the control mechanism normally tends to maintain. As shown the connection preventing relative rotation of the shaft and cam comprises a bar $U^7$ carried by collars $U^8$ secured on the shaft $U'$, and against which a projection $U^9$ of the table U is gravity held.

The table U is provided at its free end with an uprising portion having an inclined upper edge adapted to engage the pointer $n'$. Preferably, in many instances at least, the pointer engaging edge of the table U is formed with stepped shoulders UO, $UH'$, $UH^2$, etc., and $UL'$, $UL^2$, etc., so disposed as to give a suitably large control effect for a relatively small displacement of the pointer $n'$ from its neutral position.

The table U may be adjusted longitudinally of the shaft $U'$ by the manual or automatic rotation of a shaft $U^{10}$ journalled in the instrument framework and formed with a helical groove $U^{11}$ receiving a projection $U^{12}$ from a table adjusting carriage $U^{13}$ which is supported at one end by the shaft $U^{10}$ and is supported at the opposite end by upturned apertured ears $U^{14}$. The latter rotatably and slidably receive the shaft $U'$ and the apertured ears $U^6$ fit snugly between the ears $U^{14}$. As shown the described adjustment of the table U is effected manually by means of a knob $U^{15}$ on one end of the shaft $U^{10}$.

The shaft $U'$ and associated parts are so loaded by gravity or spring action that the table U tends to turn into engagement with the pointer $n'$ whenever permitted so to do. Such movement of the table U into engagement with the pointer $n'$ is permitted only on the displacement of the lever F from its normal position effected once in each rotation of the cam disc G by the pin $G^1$ carried by said disc. When the lever F is in its normal position, a pin $F^5$ carried by the lever F engages an arm $U^2$ secured to the shaft U and holds the latter in a position in which the pointer engaging edge of the table U is below the pointer $n'$. The lever $U^3$, when free to do so turns into engagement with the lever $U^2$ and is moved by the latter into a position corresponding to that of the table U when the collar is in engagement with the pointer $n'$. The then position of the arm $U^3$, and consequently of the element T, may be adjusted in the construction illustrated by the rotation of an abutment screw $U^5$ threaded through a bracket extension of the arm $U^3$ and through which the latter is engaged by the lever $U^2$ in adjusting the position of the arm $U^3$ into correspondence with that of the pointer $n$. The separable connection formed by the arm $U^3$, between the element T and the lever $U^2$ permits the element T to be held in the position into which it has been adjusted for the time required for the exercise of control functions without interfering with the return of the arm $U^2$ to its normal position by the pin $F^5$ on the lever F.

The positions assumed by the element T determine the magnitude and direction of controlling effects by its selective control of control levers VH and VL of a controlling switch mechanism comprising a switch structure W proper, and switch actuating levers V, VH, and VL. As shown, the levers VH and VL are pivotally supported on a shaft or pivot pin $A^{25}$ carried by the instrument framework, and are separately urged by springs $VH'$ and $VL'$ respectively, into the positions in which serrated edge portions of the levers engage with a transverse projection $T^2$ carried by the lever T. Except at intervals, the serrated edge portions of the levers VH and VL are held below the path of movement of the projection $T^2$ of the element T by a projecting finger $V'$ carried by the spring loaded lever V which is also journalled on the shaft $A^{25}$.

During an appropriate portion of each rotation of the disc G, the lever V is tilted to raise the projection $V'$ by the engagement of a cam roller $V^2$ carried by the lever V, with the cam portion JV of a member JB which replaces the member JA of Figs. 1 to 14, and differs from the latter only by the provision of said cam portion JV. To permit the lever V to be held by its loading spring $J^{10}$ in its lower position in which it bears against a stop pin AV throughout the return or counter-clockwise movement of the member JV, the cam portion JV of the latter is formed with a slot $JV'$. The roller $V^2$ enters the open end of the slot $JV'$ at the beginning of the return movement of the member JV. An inclined port $JV^2$ of the cam portion JV forces the roller $V^2$ laterally to the side of the cam JV during the final portion of the return movement. At the end of the latter the roller $V^2$ snaps laterally back into the position shown in the drawings. The end portion of the lever V is made laterally flexible to permit the described lateral movements of the roller $V^2$.

The switch structure W comprises side by side spring contact members WL and WH, and opposing side by side springs contact members WC. The four spring contacts are so formed that when not subjected to external forces, the contacts WL and WH do not engage with the corresponding contacts WC. The two contacts WC are simultaneously moved towards the contacts WL and WH by a switch lever $W'$ pivoted at $W^2$ and carrying fingers $W^3$ adapted to engage the contacts WC and depress the latter when the lever $W'$ as seen in Fig. 15 is turned in the clockwise direction. The lever $W'$ is given such movement once during each rotation of the cam disc G by a latch or hook lever $W^4$ pivoted to the lever V and constantly urged by a spring $W^5$ in the direction to cause the lever $W^4$ to hook over a projection $W^6$ of the lever $W'$ when the lever V is raised by the cam JV. On the return movement of the lever V, the hook lever $W^4$ depresses the lever $W'$, and thereby the contacts WC, until a stationary pin $W^7$, acting against a cam surface on the latch lever $W^4$ tilts the latter against the action of the spring W⁵ sufficiently to release the projection W⁶.

Whether or not either of the contacts WL and WH is engaged by the corresponding contact WC when the lever W' depresses the latter, depends upon the position of the selective control member T which determines the action of its projection T² on the levers VL and VH. The springs VL' and VH' respectively, acting on those levers, tend to hold the latter in positions in which their fingers VL² and VH² engage the contacts WL and WH respectively, and deflect the latter into positions in which they may be engaged by the contacts WC after a slight initial depression of the latter. Whether or not either of the levers VL or VH engages the corresponding contacts WL and WH and thus causes the latter to be engaged by the corresponding contact WC when the lever W' is depressed, is determined by the points of engagement of the projection T² with the levers VL and VH.

The lever VL is provided with an inclined serrated or toothed portion VL³, and when the projection T² engages one or another of the serration or tooth notches VL³ of the lever VL, the latter is held by its spring VL' in a position in which contact will be made between the contact WL and the corresponding contact WC during the corresponding depressing movement of the latter. The length of the time interval during which such contact is maintained, depends upon which serration or tooth notch in the lever VL is engaged by the projection T². If the latter engages the lever VL relatively near the serrated flat portion VL⁴ of the lever VL, the contact period will be relatively short, while if it engages a notch in the portion VL³ relatively remote from the flat portion VL⁴, the duration of the contact will be relatively long. The lever VH is provided with serrated inclined and flat portions VH³ and VH⁴ generally similar in purpose and form to the portions VL³ and VH⁴, but reversely arranged as shown. The inclined portion VL³ is in position to be engaged by the projection T² of the element T when the latter is at the low side of its neutral position. Conversely, the inclined portion VH³ of the lever VH is so located as to be engaged by the projection T² only when the element T is at the high side of its neutral position. When the element T occupies its neutral position, the projection T² engages overlapping parts of the flat portions VL⁴ and VH⁴, and thereby holds both levers VL and VH in such retracted positions that neither of the contacts WL and WH can then engage the corresponding contact WC.

With the projection T² of the element T in engagement with the serrated inclined portion of either lever VL or VH, the resultant engagement by the corresponding contact WL or WH of the superposed contact WC, depresses the lever VL or VH and thus disengages the latter from the projection T². The element T is not then permitted to swing out of the position into which it has previously been set, however, because the engagement of the projection T² with the flat portion VH⁴ or VL⁴ of the other of the two levers VL and VH, maintains the element T in its position until the return of the lever V to its lowermost position, operates through the projection V' to return both levers VH and VL to their lowermost positions.

The particular form of switch mechanism W and its actuating mechanism, disclosed herein did not originate with me, but with Richard P. Brown, and is disclosed and claimed in Patent No. 1,826,986, granted October 13, 1931.

The engagement of the contact WL by the contact WC produces a controlling effect in one direction, and the engagement of the contact WH and the corresponding contact WC produces a controlling effect in the opposite direction. The magnitude of each controlling effect so produced obviously depends upon whether the corresponding contact WL or WH is engaged relatively early, or relatively late in the corresponding depressing movement of the lever W'. The actual magnitude of each such controlling effect is directly dependent upon the position of the galvanometer pointer B', and upon the position of the projection n' from the exhibiting carriage n, each with respect to its neutral position and is a function of the algebraic sum of the two displacements. When the galvanometer pointer B' and the projection n' are each displaced in the same direction, for example, each to the low side of its neutral position, the effect of the two displacements upon the position of the element T, and therefore upon the control effect produced, are cumulative. When the galvanometer pointer B' is deflected to one side, and the projection n' is deflected to the other side of the corresponding neutral point, the position of the control element T, and thereby the magnitude and direction of the resultant control effect, is a function of the difference between the two displacements.

In general, I consider it practically sufficient and desirable to provide the control table U with fewer pointer engaging steps or shoulders than are provided on the table C, and to restrict the direct effect of the table C on the control mechanism to that which could be obtained if some of the steps at the high end and some of the steps at the low end of the table C, were omitted. In other words, the full number of pointer engaging steps on the table C desirably provided to permit of a wide range of potentiometer re-balancing operations, is in general not required for control purposes. Thus, in the apparatus shown in Figs. 15, 16 and 17, the lever S is formed with 7 shoulders, SO, SH', SH², SH³, SL', SL² and SL³. The pointer $e$ will be brought above one or another of these shoulders when the galvanometer pointer B' is above the portion of the table C comprising the neutral point CO thereof and the three adjacent pointer engaging steps or shoulders at each side of the neutral point. If the pointer B swings to the high side of the above mentioned portion of the table C, the pointer $e$ will engage the elongated shoulder SH³ at some point along the length of the latter, and if the galvanometer swings to the low side of the said portion of the table C, the pointer $e$ will engage the elongated shoulder SL³ at some point along the length of the latter.

As shown, the table U is provided with a neutral step UO, two steps UH' and UH² at the high side of the latter, and two steps UL' and UL² at the low side of the latter. As shown the inclined portions VH³ and VL³ are each formed with eight tooth notches or shoulders adapted for engagement by the projection T² of the element T.

If the apparatus is so proportioned that the period during which the contact WL or WH is in engagement with the corresponding contact WC when the projection T² engages any particular tooth notch in the inclined portions VL³ or VH³, will be a half second longer or shorter than if the projection entered an immediately adjacent tooth notch; and is so proportioned that shifting the engagement of the pointer $n'$ from one shoulder to an adjacent shoulder of the table U, shifts the projection T² from one to another of two adjacent notches in the serrated portions of the levers VH and VL, while shifting the engagement of the pointer $e$ from one to another of two adjacent ones of the seven shoulders SH³, SH², etc., of the lever S shifts the projection T² a distance corresponding to two tooth notches along the serrated portions of the levers VL and VH, then the time periods during which the contact WL is in engagement with the corresponding contact WC may vary by one-half second increments from one-half second up to four seconds each, and the time periods of engagement of the contact WH and the corresponding contact WC may similarly vary from one-half second to four seconds each.

It will be understood, of course, that the step arrangements and ranges of energization periods described in the preceding paragraph are given for illustration purposes and may be varied widely to meet different operating conditions. The particular step arrangement and range of energization periods given in the preceding paragraph, however, are those which have been found desirable in one form of control instrument embodying the invention herein claimed, and designed for use in controlling oil heating furnaces.

The controlling effects due to the engagement of the contacts WL and WH with the corresponding contacts WC may be exerted for various purposes and in various ways depending upon the use to which the control instrument is put, and upon the form and character of the relay or other mechanism controlled. The diagram shown in Fig. 21 illustrates a control system suitable for use in regulating the fuel supplies to each of a plurality of furnaces so as to maintain the work temperature in each furnace at an approximately constant or predetermined value. As previously explained the various thermocouples Y', Y², Y³, Y⁴, Y⁵ and Y⁶ are responsive each to the work temperature in a corresponding furnace, and are successively connected in circuit with the galvanometer B by the action of the switch QA. In the control system illustrated in Fig. 21 the fuel supply for each of the different furnaces is increased or decreased by the operation in one direction or the other of a corresponding reversible relay motor. Z', Z², Z³, Z⁴, Z⁵ and Z⁶ represent the relay motors for the different furnaces to which the thermocouples Y', Y², Y³, Y⁴, Y⁵ and Y⁶, respectively pertain.

The transfer switch QB, which may be similar in general construction and mode of operation to the transfer switch QA previously described, serves to connect the different motors Z', Z², Z³, Z⁴, Z⁵ and Z⁶, with the instrument control switch mechanism W, successively as the corresponding thermocouples Y', Y², Y³, Y⁴, Y⁵ and Y⁶ are successively connected by the transfer switch A to the galvanometer B.

As diagrammatically illustrated in Fig. 21 each of the motors Z', Z², Z³, Z⁴, Z⁵ and Z⁶ has a common terminal connected to an energizing supply conductor 1. A second terminal ZL', ZL², ZL³, ZL⁴, ZL⁵ or ZL⁶ of each of the different motors is connected to a corresponding contact or segment $qL'$, $qL^2$, $qL^3$, $qL^4$, $qL^5$ or $qL^6$, respectively, of the transfer switch QB, and the contact $qL^7$ of the latter which is rotated by the shaft $Q^{100}$, successively connects the contacts $qL'$, $qL^2$, etc., to the contact WL of the switch mechanism W. The contact WC of the latter is connected to the supply conductor 2, between which and the supply conductor 1 a suitable potential difference is maintained. In consequence, when the contact $qL^7$ of the transfer switch QB engages one of the contacts $qL'$, $qL^2$, etc., for example, the contact $qL^2$, the corresponding motor, Z² in the example given, will be energized to increase the fuel supplied to the corresponding furnace while the contact WL engages the corresponding contact WC. The length of the time interval during which the motor Z² is thus energized, and consequently the magnitude of the change in the fuel supply rate produced, will depend upon the length of the time interval during which the contact WL is then maintained in engagement with the corresponding contact WC.

The third terminals $ZH'$, $ZH^2$, $ZH^4$, $ZH^5$ and $ZH^6$ of the various motors C are separately connected to another series of contacts $qH'$, $qH^2$, $qH^3$, $qH^4$, $qH^5$ and $qH^6$ respectively of the transfer switch mechanism QB, and the contacts last referred to are successively connected to the contact WH of the control switch mechanism W as a result of the rotation of the contact $qH^7$ effected by the shaft $Q^{100}$, during the operative stages in which the thermocouples $Y'$, $Y^2$, $Y^3$, $Y^4$, $Y^5$ and $Y^6$ are respectively connected to the galvanometer B. When the contact WH of the instrument control switch mechanism W engages the corresponding contact WC, whichever of the motors $Z'$, $Z^2$, $Z^3$, $Z^4$, $Z^5$ and $Z^6$ then has its terminal $ZH'$, $ZH^2$, etc., connected to the contact $qH^7$ is caused to rotate in the direction to reduce the fuel supplied to the corresponding furnace, by an amount depending on the time interval during which the contact WH then remains in engagement with the contact WC.

In Figs. 18–20 I have illustrated control provisions of somewhat different character from those shown in Figs. 15 to 17 but equally applicable for use in combination with the measuring apparatus of the character shown in Figs. 1 to 14. The control mechanism shown in Figs. 18 to 20 comprises a selective control element TA corresponding generally in function and operation to the selective control element T of the mechanism shown in Figs. 15 to 17. The element TA is adjusted into its operative positions by mechanisms somewhat different from that employed in Figs. 15 to 17 to control the operative positions of the element T, and the position of the element TA controls the actuation of a switch mechanism WA, through means differing in form from, though generally equivalent in substance to, those through which the element T controls the actuation of the switch mechanism W in the arrangement shown in Figs. 15 to 17.

The element TA is in the form of a floating lever, and is held in a retracted inoperative position against the action of a spring $T^{20}$ during a portion of each rotation of the cam disc G, by the lever HA, which, for this purpose, is provided with a pin $H^{20}$ working in a slot $T^{21}$ formed in the lower end of the element TA. The lever HA performs the same functions as those heretofore ascribed to the lever H, from which the lever HA differs in form only in having its body portion bent or shaped to facilitate the location of the pin $H^{20}$ at such a considerable distance below the main operative portions of the element TA, that the variable angular movement of the lever HA will have no significant effect upon the angular position of the element TA when the latter is permitted to move from its retracted position into its operative position under the action of the spring $T^{20}$.

The angular position assumed by the element TA when the movement of the lever HA permits the element TA to move upward under the action of the spring $T^{20}$, depends upon the then position of a lever X, which has a shoulder $X'$ against which an upper edge portion $T^{220}$ of the element TA is held at all times by the action of gravity and by the pull of the spring $T^{20}$. The operative position of the lever X is made jointly dependent on the position of the primary control table C and on the position of the indicator and recorder positioning carriage $n$, through connections between the primary control table shaft E, and the lever X, and through connections between the secondary control table shaft $U'$ and the lever X.

The operative connections between the shaft $U'$ and the lever X comprise an arm $U^{20}$ fixed on the shaft $U'$ and pivotally supporting the lever X through a pivot pin $U^{21}$. A spring $X^{20}$ tends at all times to turn the lever X in the clockwise direction about the pivot pin $U^{21}$, but the lever X is held in a retracted position by the shaft $U'$, when the latter is in its normally retracted position. As shown the shaft $U'$ thus normally holds the lever X in its retracted position by means of a finger $U^{22}$ projecting between the adjacent edges of the arm $U^{20}$ and lever X, and carried by an arm loosely mounted on the shaft $U'$. As the shaft $U'$ is rotated in the counter clockwise direction from its operative position, shown in Fig. 19, into its inoperative position, shown in Fig. 18, the lever X and arm $U^{20}$ approach one another, scissors blade fashion, until the projection $U^{22}$ is gripped between the arm $U^{20}$ and lever X, after which the lever X shares in the further counter clockwise movement of the arm $U^{20}$ as though rigidly secured to the latter.

In the arrangement shown in Figs. 18 to 20, the shaft $U'$ is rotated from its retracted position to bring the table U into engagement with the pointer or pin $n'$ by the lever FA. The latter differs from the lever F of Figs. 1 to 16 only in form, and in that respect only as a result of the provision thereon of an integral projection $FA'$ adapted to engage an arm $U^{23}$ mounted on the shaft $U'$, and connected to the latter by the spring $U^{24}$. As the lever FA turns clockwise under the action of the pin $G'$, the projection $FA'$ engages and turns the arm $U^{23}$. The shaft $U'$ shares the angular movement of the arm $U^{23}$ until the table U engages the pointer $n'$, whereupon the spring $U^{24}$ yields to permit the table U and arm $U^{20}$ to remain stationary, as the arm $U^{23}$ is given further movement by the lever FA.

When the shaft U' turns in the clockwise direction to bring the table U into engagement with the pointer n', the lever X turns with the arm U²⁰ about the axis of the shaft U' until the movement of the upper end of the lever X is arrested by the provisions through which the operating position of the lever X is made dependent in part upon the then position of the primary control table C. The table C it will be remembered, is secured to the rock shaft E, and the provisions through which the table C exerts a controlling effect on the position of the lever X and thereby on the element TA, comprise an arm E²⁰ journalled on the shaft E but tending to share in the angular movements of the latter under the action of a spring E²². The latter tends to hold the upper edge of the arm E²⁰ against a projecting portion of an arm E²¹ rigidly secured to the shaft E. The clockwise movement of the arm E²⁰ is limited by a stop pin EA carried by the instrument framework. In the particular instrument shown, the stop EA is so located that the rising movement of the arm E²⁰ will be arrested after an upward movement of the table C sufficient to bring the second shoulder to the left of the neutral table point CO as seen in Fig. 7 to the level for engagement with the galvanometer pointer B'. If the table C when free to move into engagement with the galvanometer pointer B', is prevented by the latter from rising high enough to bring the above mentioned second shoulder to the left of the neutral point, the corresponding upward movement of the arm E²⁰ will be arrested before engaging the stop EA.

The lever X is formed with a stepped shoulder portion comprising a neutral step or shoulder XO, shoulders XH' and XH² at one side of the neutral point, and shoulders XL' and XL² at the opposite side of the neutral point XO. The clockwise turning movement of the lever X under the action of the spring X²⁰ occurring when the clockwise rotation of the shaft U' permits, is arrested by the engagement of a projection at the free end of the arm E²⁰ with one or the other of the shoulders XL², XL', XL⁰, XH', XH², according to the position into which the arm E²⁰ has then been adjusted.

In the operative position of the element TA, controlled as above described by the position of the lever X, the element TA may exert switch actuating effects on the switch mechanism WA through one or the other switch actuating levers WH²⁰ and WL²⁰, accordingly as one or the other of these levers engages shoulders formed on stepped shoulders or control table parts T²² and T²³ formed by the element TA at its upper end and preferably formed of bakelite or other insulating material. In a neutral or intermediate position of the element TA, the ends of the levers WH²⁰ and WL²⁰ clear the operative portions of the parts T²² and T²³.

The switch mechanism WA, employed in the construction shown in Figs. 18 to 20 differs from the switch mechanism W in the omission of the switch lever W' and associated parts of the latter. In the switch mechanism WA, the engagement, and duration of engagement, of each contact WL and WH with the corresponding contact WC, is directly controlled by the movement given to the corresponding lever WL²⁰ and WH²⁰ by the selective control element TA. In the neutral position of the latter, both levers WL²⁰ and WH²⁰ are spring held in inoperative positions in which neither contact WL or WH engages the corresponding contact WC. When the element TA is deflected to the low side of its neutral position, the lever WL²⁰ engages one or another of the tooth notches in the element part TL, and is thereby caused to effect engagement between the contact WL and the corresponding contact WC, for a time interval depending on which tooth notch in the part TL is engaged by the lever WL²⁰. Conversely, when the element TA is at the high side of its neutral position, the lever WH²⁰ engages a tooth notch in the part TH, and the contact WH engages the corresponding contact WC for a time interval dependent on which tooth notch in the part TH is so engaged.

As will readily be apparent, the magnitude or duration of the different controlling effects obtainable with the mechanism shown in Figs. 18 to 20 may be proportioned to one another exactly as are those obtained with the mechanism shown in Figs. 15 to 17. Only simple changes in the proportion and form of one or two parts are required in either arrangement to produce wide variations in the magnitude of the controlling effect resulting from any particular displacements of the galvanometer pointer B' and the exhibiting pointer n' relative to their respective neutral positions.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a circuit for measuring and controlling instruments comprising a bridge having four resistance arms and four junction points, a meter, a source of E. M. F. and an adjustable resistance connected between an opposing pair of junction points, means for adjusting one of the last mentioned junction points to vary the relative resistance values of the adjacent resistance arms, and means for simultaneously varying said adjustable resistance, said resistances being so relatively proportioned that the sum of the bridge resistance between said opposing pair of junction points and the portion of said adjustable resistance in circuit with the meter is not materially altered by the said simultaneous resistance variations.

2. The combination with a shaft, of a member secured to said shaft, a member journalled on said shaft, gearing connecting said members through which a rotation of either member produces a reverse rotation of the other member, a periodically movable element adapted to turn either member in one and the same direction about the axis of said shaft when operatively coupled thereto, and selective mechanism coupling said element sometimes to one and sometimes to the other of said members.

3. The combination with an actuating member and a pair of levers all pivoted to oscillate about the same axis, said levers each having an engaging surface, said surfaces being located at different distances from said axis and a thrust member adjustable toward and away from said axis to operatively connect one or the other of said levers to said actuating member.

4. The combination with an actuating member, means for periodically oscillating said member about a pivotal axis, of two actuated members mounted to turn about the same axis and each having an engaging surface, one of said surfaces being located at a greater distance from said axis than the other, and a selectively adjustable thrust member movable toward and away from said axis into position between one or the other of said surfaces and said actuating member.

5. In a potentiometer measuring instrument, the combination with a galvanometer and its pointer, of a potentiometer balancing mechanism comprising a secondary pointer, means for setting the latter periodically into a position dependent on the then position of the galvanometer pointer, a pair of pawl and ratchet mechanisms and means dependent on the position of said secondary pointer for selectively actuating one or the other of said mechanisms accordingly as said secondary pointer is at one side or the other of a neutral position.

6. In a potentiometer instrument, the combination of potentiometer balancing means including an operating shaft, means for selectively actuating said shaft comprising a ratchet wheel secured to said shaft, a second ratchet wheel mounted loosely on said shaft, gearing connecting said wheels for causing the rotation of either to produce rotation of the other in the opposite direction, a ratchet mechanism comprising an oscillating pawl and pawl carrier associated with each wheel, means for imparting similar oscillatory movements to the two pawl carriers, means normally holding each pawl out of operative engagement with the corresponding wheel, and means for selectively effecting operative engagement of one pawl or the other with the corresponding wheel according to the direction and magnitude of departure of the quantity measured from a predetermined value thereof.

7. The combination with a deflecting meter element, of a cooperating element periodically movable transversely of the plane of deflection of the first mentioned element into engagement with the latter, said elements having engaging surfaces one of which is inclined to said plane whereby the position of said second element on engagement with the first mentioned element depends upon the deflection of the latter, and means selectively controlled by the position of said second element at the time of such engagement for exerting an effect varying in direction according to the portion of said inclined surface then engaged by the other of said surfaces, said inclined surface comprising an intermediate portion and end portions less steeply inclined than said intermediate portion.

8. The combination with a deflecting meter pointer, of a cooperating element, periodically movable transversely of the plane of deflection of said pointer into engagement with the latter, said element having a pointer engaging surface inclined to said plane and comprising a plurality of pointer engaging shoulder portions whereby the position of said element on engagement with said pointer depends upon the deflection of the latter, and means selectively controlled by the position of said element at the time of such engagement for exerting an effect varying in direction according to the shoulder portion of said inclined surface then engaged by the other of said surfaces, said shoulder portions being arranged in an intermediate approximately straight row and end extensions of said row less steeply inclined than the latter.

9. In a potentiometer instrument, the combination with a galvanometer and its deflecting pointer, of means for periodically locking the pointer in any position into which it may have deflected, a member, means for effecting such a movement of said member into engagement with said pointer, whenever the latter is locked by the first mentioned means, that the position of the member on said engagement is dependent upon the position of the pointer, a secondary pointer selectively positioned by said member on each engagement of the latter with the pointer according to the then position of the latter, and a relay mechanism cooperating with said secondary pointer to effect potentiometer rebalancing adjustments dependent in direction upon the direction of the then displacement of the pointer from a neutral position of the latter.

10. In a potentiometer instrument, the combination with a galvanometer and its deflecting pointer, of means for periodically locking the pointer in any position into which it may have deflected, a member, means for effecting such movement of said member into engagement with said pointer whenever the latter is locked by the first mentioned means, that the position of the member on said engagement is dependent upon the position of the pointer, a secondary pointer selectively positioned by said member on each engagement of the latter with the pointer according to the then position of the latter, and a relay mechanism cooperating with said secondary pointer to effect potentiometer rebalancing adjustments dependent as to magnitude and direction upon the extent and direction of the then displacement of the pointer from a neutral position of the latter.

11. In an instrument of the character described, the combination with a deflecting meter pointer, an abutment along which the free end of the pointer normally moves without engaging the latter, and mechanism periodically engaging and releasing said pointer and clamping the latter against said abutment on each engagement, said mechanism including means for striking the pointer and jarring it out of engagement with said abutment when said mechanism releases said pointer.

12. In an instrument of the character described comprising a deflecting meter pointer and an abutment along which the free end of the pointer normally moves without engaging said abutment, mechanism periodically engaging said pointer to first clamp it against said abutment and then release it, said mechanism including a member moving transversely to the plane of pointer deflection and including a straight edge parallel to said abutment and on the same side of the pointer as said abutment and adapted to form a support for the pointer limiting the bending of the latter when clamped against said abutment and to strike said pointer and jar it loose from said abutment when the pointer is released.

13. In a potentiometer instrument the combination with a galvanometer and its deflecting pointer, of means for periodically locking the pointer in any position into which it may have deflected, a pivoted member adapted to turn into engagement with said pointer through an arc the extent of which varies with the then deflection of the pointer, means for effecting such turning movement of said member whenever the latter is locked by the first mentioned means a secondary pointer selectively positioned by said member on each engagement of the latter with the pointer according to the then position of the latter, and a relay mechanism cooperating with said secondary pointer to effect a potentiometer rebalancing adjustment dependent as to its direction upon the direction of the then displacement of the pointer from a neutral position of the latter.

14. In a potentiometer instrument the combination with a galvanometer and its deflecting pointer, of means for periodically locking the pointer in any position into which it may have deflected, a pivoted member adapted to turn into engagement with said pointer through an arc the extent of which varies with the then deflection of the pointer, means for effecting such turning movement of said member whenever the latter is locked by the first mentioned means, a secondary pointer selectively positioned by said member on each engagement of the latter with the pointer according to the then position of the latter, and a relay mechanism cooperating with said secondary pointer to effect a potentiometer rebalancing adjustment dependent as to its direction upon the direction of the then displacement of the pointer from a neutral position of the latter, the first and second mentioned means operating to release said pointer during each period in which said relay mechanism is effecting a potentiometer rebalancing adjustment.

15. In an instrument of the character described, the combination with a deflecting meter pointer, of instrument framework including an abutment along which the free end of the pointer normally moves without engaging the latter, a movable selector member mounted in said framework, yielding means tending to move said member into engagement with said pointer whereby the latter is moved into a position in which it engages and is supported by said abutment, the position of said member when the pointer is in engagement with said member and abutment being selectively dependent upon the deflection of said pointer, and means alternately holding said member out of, and releasing it to permit its movement into, engagement with said pointer.

Signed at Philadelphia, in the county of Philadelphia and State of Pennsylvania, this 24th day of November A. D., 1928.

THOMAS R. HARRISON.